US010326284B2

(12) United States Patent
Long et al.

(10) Patent No.: US 10,326,284 B2
(45) Date of Patent: Jun. 18, 2019

(54) CONTROL MODULE FOR DC POWER NETWORK

(71) Applicant: Protonex Technology Corporation, Southborough, MA (US)

(72) Inventors: David N. Long, Northborough, MA (US); Seth M. Dziengeleski, Southbridge, MA (US); Gregory D. McConnell, Jefferson, MA (US)

(73) Assignee: Revision Military Ltd., Essex, VT (US)

( * ) Notice: Subject to any disclaimer, the term of this patent is extended or adjusted under 35 U.S.C. 154(b) by 45 days.

(21) Appl. No.: 15/524,826

(22) PCT Filed: Nov. 9, 2015

(86) PCT No.: PCT/US2015/059712
§ 371 (c)(1),
(2) Date: May 5, 2017

(87) PCT Pub. No.: WO2016/077216
PCT Pub. Date: May 19, 2016

(65) Prior Publication Data
US 2017/0338665 A1    Nov. 23, 2017

Related U.S. Application Data

(60) Provisional application No. 62/077,993, filed on Nov. 11, 2014, provisional application No. 62/168,992, filed on Jun. 1, 2015.

(51) Int. Cl.
*H02J 7/00* (2006.01)
*H02J 1/00* (2006.01)
(Continued)

(52) U.S. Cl.
CPC .......... *H02J 7/0004* (2013.01); *H02J 7/0027* (2013.01); *H02J 7/34* (2013.01); *H02J 13/0003* (2013.01); *H02J 1/00* (2013.01); *H02J 7/355* (2013.01)

(58) Field of Classification Search
CPC .... H02J 7/0004; H02J 7/0027; H02J 13/0003; H02J 7/34; H02J 1/00; H02J 7/355
(Continued)

(56) References Cited

U.S. PATENT DOCUMENTS 4,044,268 A   8/1977 Hammel et al.
4,589,075 A   5/1986 Buennagel
(Continued)

FOREIGN PATENT DOCUMENTS

EP        2230743      11/2013
WO    2006/126023    11/2006
(Continued)

OTHER PUBLICATIONS

International Search Report for PCT/US2015/059712 dated Feb. 24, 2016.
(Continued)

*Primary Examiner* — M Baye Diao
(74) *Attorney, Agent, or Firm* — Burns & Levinson, LLP; George N. Chaclas

(57) ABSTRACT

A power distribution and control module includes a digital data processor and associated memory module operating an energy management program or schema and a battery charging manager program thereon. The energy management schema is operable to determine an instantaneous configuration of the power and distribution and control module, to determine total instantaneous input power available, total instantaneous power demand by connected power loads and to allocate a portion of the input power to power the loads. Thereafter any unallocated power is allocated to charge rechargeable batteries using allocation criteria that are situationally variable.

15 Claims, 6 Drawing Sheets

Power DC Power Loads

(51) Int. Cl.
  *H02J 7/34* (2006.01)
  *H02J 7/35* (2006.01)
  *H02J 13/00* (2006.01)

(58) Field of Classification Search
  USPC .................................................... 320/160
  See application file for complete search history.

(56) References Cited

U.S. PATENT DOCUMENTS

| | | | |
|---|---|---|---|
| 4,910,100 A | 3/1990 | Nakanishi et al. | |
| 4,931,947 A | 6/1990 | Werth et al. | |
| 5,153,496 A | 10/1992 | Laforge | |
| 5,258,244 A | 11/1993 | Hall et al. | |
| 5,321,349 A | 6/1994 | Chang | |
| 5,570,002 A | 10/1996 | Castleman | |
| 5,650,240 A | 7/1997 | Rogers | |
| 5,675,754 A | 10/1997 | King et al. | |
| 5,754,445 A | 5/1998 | Jouper et al. | |
| 5,831,198 A | 11/1998 | Turley et al. | |
| 5,898,291 A | 4/1999 | Hall | |
| 5,903,764 A | 5/1999 | Shyr et al. | |
| 5,914,585 A | 6/1999 | Grabon | |
| 5,945,806 A | 8/1999 | Faulk | |
| 5,977,656 A | 11/1999 | John | |
| 5,986,437 A | 11/1999 | Lee | |
| 6,014,013 A | 1/2000 | Suppanz et al. | |
| 6,025,696 A | 2/2000 | Lenhart et al. | |
| 6,046,514 A | 4/2000 | Rouillard et al. | |
| 6,087,035 A | 7/2000 | Rogers et al. | |
| 6,107,880 A * | 8/2000 | Shaw | H03F 1/0261 |
| | | | 330/129 |
| 6,137,280 A | 10/2000 | Ackermann et al. | |
| 6,198,642 B1 | 3/2001 | Kociecki | |
| 6,221,522 B1 | 4/2001 | Zafred et al. | |
| 6,246,215 B1 | 6/2001 | Popescu-Stanesti | |
| 6,265,846 B1 | 7/2001 | Flechsig et al. | |
| 6,271,646 B1 | 8/2001 | Evers et al. | |
| 6,366,061 B1 | 4/2002 | Carley et al. | |
| 6,366,333 B1 | 4/2002 | Yamamoto et al. | |
| 6,370,050 B1 | 4/2002 | Peng et al. | |
| 6,376,938 B1 | 4/2002 | Williams | |
| 6,396,391 B1 | 5/2002 | Binder | |
| 6,459,175 B1 | 10/2002 | Potega | |
| 6,476,581 B2 | 11/2002 | Lew | |
| 6,485,852 B1 | 11/2002 | Miller et al. | |
| 6,492,050 B1 | 12/2002 | Sammes | |
| 6,530,026 B1 | 3/2003 | Bard | |
| 6,541,879 B1 | 4/2003 | Wright | |
| 6,608,463 B1 | 8/2003 | Kelly et al. | |
| 6,627,339 B2 | 9/2003 | Haltiner, Jr. | |
| 6,628,011 B2 | 9/2003 | Droppo et al. | |
| 6,633,823 B2 | 10/2003 | Bartone et al. | |
| 6,690,585 B2 | 2/2004 | Betts-Lacroix | |
| 6,694,270 B2 | 2/2004 | Hart | |
| 6,703,722 B2 | 3/2004 | Christensen | |
| 6,707,284 B2 | 3/2004 | Lanni | |
| 6,828,695 B1 | 12/2004 | Hansen | |
| 6,831,848 B2 | 12/2004 | Lanni | |
| 6,925,361 B1 | 8/2005 | Sinnock | |
| 6,985,799 B2 | 1/2006 | Zalesski et al. | |
| 7,001,682 B2 | 2/2006 | Haltiner, Jr. | |
| 7,002,265 B2 | 2/2006 | Potega | |
| 7,036,028 B2 | 4/2006 | Zalesski | |
| 7,071,660 B2 | 7/2006 | Xu et al. | |
| 7,076,592 B1 | 7/2006 | Ykema | |
| 7,105,946 B2 | 9/2006 | Akiyama et al. | |
| 7,166,937 B2 | 1/2007 | Wilson et al. | |
| 7,188,003 B2 | 3/2007 | Ransom et al. | |
| 7,203,849 B2 | 4/2007 | Dove | |
| 7,212,407 B2 | 5/2007 | Beihoff et al. | |
| 7,226,681 B2 | 6/2007 | Florence et al. | |
| 7,235,321 B2 | 6/2007 | Sarkar et al. | |
| 7,243,243 B2 | 7/2007 | Gedeon | |
| 7,274,175 B2 | 9/2007 | Manolescu | |
| 7,385,373 B2 | 6/2008 | Doruk et al. | |
| 7,388,349 B2 | 6/2008 | Elder et al. | |
| 7,408,794 B2 | 8/2008 | Su | |
| 7,436,687 B2 | 10/2008 | Patel | |
| 7,444,445 B2 | 10/2008 | Kubo et al. | |
| 7,506,179 B2 | 3/2009 | Templeton | |
| 7,531,915 B2 | 5/2009 | Wang et al. | |
| 7,541,693 B2 | 6/2009 | Huang et al. | |
| 7,618,260 B2 | 11/2009 | Daniel et al. | |
| 7,646,107 B2 | 1/2010 | Smith | |
| 7,674,543 B2 | 3/2010 | Chiang et al. | |
| 7,675,758 B2 | 3/2010 | Artusi et al. | |
| 7,683,575 B2 | 3/2010 | Berdichevsky et al. | |
| 7,701,082 B2 | 4/2010 | Lazarovich et al. | |
| 7,778,940 B2 | 8/2010 | Mazzarella | |
| 7,808,122 B2 | 10/2010 | Menas et al. | |
| 7,814,348 B2 | 10/2010 | Krajcovic et al. | |
| 7,834,479 B2 | 11/2010 | Capp et al. | |
| 7,838,142 B2 | 11/2010 | Scheucher | |
| 7,844,370 B2 | 11/2010 | Pollack et al. | |
| 7,847,532 B2 | 12/2010 | Potter et al. | |
| 7,849,341 B2 | 12/2010 | Sugiyama | |
| 7,855,528 B2 | 12/2010 | Lee | |
| 7,928,720 B2 | 4/2011 | Wang | |
| D640,192 S | 6/2011 | Robinson et al. | |
| 8,073,554 B2 | 12/2011 | Vezza et al. | |
| 8,086,281 B2 | 12/2011 | Rabu et al. | |
| 8,103,892 B2 | 1/2012 | Krajcovic | |
| 8,106,537 B2 | 1/2012 | Casey et al. | |
| 8,138,631 B2 | 3/2012 | Allen et al. | |
| 8,140,194 B2 | 3/2012 | Iino et al. | |
| 8,164,217 B1 | 4/2012 | Miller | |
| 8,178,999 B2 | 5/2012 | Burger et al. | |
| 8,193,661 B2 | 6/2012 | Jagota et al. | |
| 8,255,090 B2 | 8/2012 | Frader-Thompson et al. | |
| 8,279,642 B2 | 10/2012 | Chapman et al. | |
| 8,294,307 B2 | 10/2012 | Tsai | |
| 8,304,122 B2 | 11/2012 | Poshusta et al. | |
| 8,312,299 B2 | 11/2012 | Tremel et al. | |
| 8,315,745 B2 | 11/2012 | Creed | |
| 8,333,619 B2 | 12/2012 | Kondo et al. | |
| 8,352,758 B2 | 1/2013 | Atkins et al. | |
| 8,375,229 B2 | 2/2013 | Saeki | |
| 8,385,986 B2 * | 2/2013 | Kim | H04M 1/72522 |
| | | | 455/574 |
| 8,401,709 B2 | 3/2013 | Cherian et al. | |
| 8,447,435 B1 | 5/2013 | Miller et al. | |
| 8,455,794 B2 | 6/2013 | Vogel | |
| 8,466,662 B2 | 6/2013 | Nania et al. | |
| 8,476,581 B2 | 7/2013 | Babayoff et al. | |
| 8,494,479 B2 | 7/2013 | Budampati et al. | |
| 8,508,166 B2 | 8/2013 | Marcinkiewicz et al. | |
| 8,548,607 B1 | 10/2013 | Belz et al. | |
| 8,599,588 B2 | 12/2013 | Adest et al. | |
| 8,611,107 B2 | 12/2013 | Chapman et al. | |
| 8,614,023 B2 | 12/2013 | Poshusta et al. | |
| 8,633,619 B2 | 1/2014 | Robinson et al. | |
| 8,638,011 B2 | 1/2014 | Robinson et al. | |
| 8,643,326 B2 | 2/2014 | Campanella et al. | |
| 8,648,492 B2 | 2/2014 | Craig et al. | |
| 8,649,914 B2 | 2/2014 | Miller et al. | |
| 8,682,496 B2 | 3/2014 | Schweitzer, III et al. | |
| D706,711 S | 6/2014 | Robinson et al. | |
| 8,775,846 B2 | 7/2014 | Robinson et al. | |
| 8,781,640 B1 | 7/2014 | Miller | |
| 8,796,888 B2 | 8/2014 | Rice et al. | |
| 8,829,713 B2 | 9/2014 | Ishigaki et al. | |
| 8,849,471 B2 | 9/2014 | Daniel et al. | |
| 8,853,891 B2 | 10/2014 | Soar | |
| 8,854,389 B2 | 10/2014 | Wong et al. | |
| 8,901,774 B2 | 12/2014 | Yan et al. | |
| 8,913,406 B2 | 12/2014 | Guthrie et al. | |
| 8,970,176 B2 | 3/2015 | Ballatine et al. | |
| 9,041,349 B2 | 5/2015 | Bemmel et al. | |
| 9,043,617 B2 | 5/2015 | Miki | |
| 9,093,862 B2 | 7/2015 | Dennis et al. | |
| 9,142,957 B2 | 9/2015 | Malmberg et al. | |
| 9,158,294 B2 | 10/2015 | Carralero et al. | |
| 9,190,673 B2 | 11/2015 | Venkataraman et al. | |
| 9,203,302 B2 | 12/2015 | Kelly | |

(56) References Cited

U.S. PATENT DOCUMENTS

| | | | |
|---|---|---|---|
| 9,207,735 B2 | 12/2015 | Khaitan et al. | |
| 9,337,943 B2 | 5/2016 | Mosebrook et al. | |
| 9,343,758 B2 | 5/2016 | Poshusta et al. | |
| 9,450,274 B2 | 9/2016 | Vo et al. | |
| 9,452,475 B2 | 9/2016 | Armstrong et al. | |
| 9,502,894 B2 | 11/2016 | Holmberg et al. | |
| 9,634,491 B2 | 4/2017 | Robinson et al. | |
| 9,637,017 B2* | 5/2017 | Sung | B60L 11/1824 |
| 9,698,596 B2 | 7/2017 | Sauer et al. | |
| 2002/0135492 A1 | 9/2002 | Reagan et al. | |
| 2003/0006905 A1 | 1/2003 | Shieh et al. | |
| 2003/0054215 A1 | 3/2003 | Doshi et al. | |
| 2003/0234729 A1 | 12/2003 | Shen | |
| 2004/0061380 A1 | 4/2004 | Hann et al. | |
| 2004/0125618 A1 | 7/2004 | De Rooij et al. | |
| 2004/0130292 A1 | 7/2004 | Buchanan et al. | |
| 2005/0037241 A1 | 2/2005 | Schneider et al. | |
| 2005/0275372 A1 | 12/2005 | Crowell | |
| 2006/0127725 A9 | 6/2006 | Sarkar et al. | |
| 2007/0078230 A1 | 4/2007 | Lai | |
| 2007/0141424 A1 | 6/2007 | Armstrong et al. | |
| 2007/0222301 A1 | 9/2007 | Fadell et al. | |
| 2008/0024007 A1 | 1/2008 | Budampati et al. | |
| 2008/0269953 A1 | 10/2008 | Steels et al. | |
| 2008/0305839 A1 | 12/2008 | Karaoguz et al. | |
| 2009/0079263 A1 | 3/2009 | Crumm et al. | |
| 2010/0001689 A1 | 1/2010 | Hultman et al. | |
| 2010/0280676 A1 | 11/2010 | Pabon et al. | |
| 2011/0184585 A1 | 7/2011 | Matsuda et al. | |
| 2011/0278957 A1 | 11/2011 | Eckhoff et al. | |
| 2011/0291616 A1 | 12/2011 | Kim et al. | |
| 2012/0205976 A1 | 8/2012 | Shih et al. | |
| 2013/0197710 A1* | 8/2013 | Hansen | B60L 11/1824 700/297 |
| 2014/0091623 A1 | 4/2014 | Shippy et al. | |
| 2014/0292081 A1 | 10/2014 | Long et al. | |
| 2015/0048794 A1 | 2/2015 | Park | |
| 2015/0357837 A1* | 12/2015 | Takai | H01M 10/44 320/107 |

FOREIGN PATENT DOCUMENTS

| | | |
|---|---|---|
| WO | 2007/012785 | 2/2007 |
| WO | 2007/048837 | 5/2007 |
| WO | 2007/076440 | 7/2007 |
| WO | 2008/072014 | 6/2008 |
| WO | 2008/072015 | 6/2008 |
| WO | 2008/090378 | 7/2008 |
| WO | 2011/023678 | 3/2011 |
| WO | 2011/046645 | 4/2011 |
| WO | WO-2011113280 A1 | 9/2011 |
| WO | 2012/122315 | 9/2012 |
| WO | 2013/083296 | 6/2013 |
| WO | 2014/165469 | 10/2014 |

OTHER PUBLICATIONS

Written Opinion of the International Search Report for PCT/US2015/059712 dated Feb. 24, 2016.
International Search Report and Written Opinion for PCT International Application No. PCT/US2014/059447 dated Jun. 30, 2015, 16 pages.
European Search Report for European Patent Application No. 15858536.4, dated May 9, 2018, 7 pages.
Bruce et al.,www.rfdesign.com, Defense Electronics, Military takes aim at high battery costs, Apr. 2005, pp. 20-25.
Singh et al., Conference Record of the Twenty-Eighth IEEE Photovoltaic Specialists Conference, Fuzzy Logic-based Solar Charge Controller for Microbatteries, 2000, pp. 172-1729.
Alibaba.com, 5KW charger controller for wind power supply and solar cell, 2009, 3 pages.
replay.waybackmachine.org/20090122152343/http://ww.sfc.com/en/about-sfc.html, About SFC Small Fuel Cell, 1 page.
www.sfc.com, About SFC Smart Fuel Cell, 2009, 1 page.
http://defense-update.com/products/b/ba5590.htm, BA 5590 Lithium Battery, Jul. 26, 2006, 1 page.
www.mpoweruk.com/bms.htm,Battery Management Systems (BMS), 2009, 12 pages.
Fran Hoffart, New charger topology maximizes battery charging speed, 1998, 2 pages.
Richter Wolfgang, Chip for saving power, Aug. 2007, 2 pages.
greentmcnet.com/topics/green/articles/57729-green-plug-partners-with-wipower-advanced-wireless-power.htm, Gren plug partners with wipower for advanced wireless power systems, 2009, 3 pages.
Wilson Rothman, gizmodo.com/295076/new-Honeywell-hdmi-cable-heals-self-but-at-what-cost, New Honeywell HDMI Cables Heals Self, But At What Cost?, Aug. 2007, 3 pages.
Ocean Server Technology, Inc., Intelligent Battery and Power System, May 2008, 4 pages.
Robert M. Button, Nasa/TM-2002-211370, Intelligent Systems for Power Management and Distribution, Feb. 2002, 12 pages.
Greg Cipriano et al., Protonex, Joint Service Power Expo, 2009, 38 pages.
Amazon.com: Morningstar TriStar-45 Solar Charge Controller for solar/wind generator/Wind Turbine—45 amps, 2009, 6 pages.
Ocean Server Technology, Inc., Smart Li-ion packs, integrated chargers, ultra high efficiency dc-dc converters, integrate battery power or backup, fully engineered (plug and run) and 95 to 25,000+ watt-hour clusters, 2007, 4 pages.
Peter Podesser, www.mil-embedded.com/articles/id/?3966, Portable power management for soldiers; Fuel cell hybrid system is lighter, safer, May 2009.
replay.waybackmachine.org/20090312005238/http://ww.sfc.com/en/man-portable-technology-power-manager.html, The SFC Power Manager—The Technology, 2009, 2 pages.
www.reuters.com/article/pressRelease/idUS159777+17-Feb-2009+BW20090217, Reuters, Protonex to Launch Soldier-Worn Portable Power Management Systems, Feb. 2009, 3 pages.
ww.sfc.com/index2.php option=com_pressreleasees&Itemid=467&id=1050&lang=en&pop-1&page=0. SFC receives commercial order for portable fuel cells, 2008 1 page.
http://fuelcellsworks.com/news/2009/06/04/sfc-smart-fuel-cell-launches-joint-power-manager, SFC smart fuel cell launches joint power manager, Jun. 2009, 4 pages.
www.nkusa.com/prod-monitor-smart-cable.htm, Nihon Kohden: Products-Monitoring, Smart Cable Technology, 1 page.
www.energyharvestingjournal.com/articles/soldier-worn-portable-power-management-system-00001375.asp?sessionid=1, Energy Harvesting Journal: Soldier-worn portable power management system, 2009, 2 pages.
www.paneltronics.com/ip.asp?op=Multiplex%20Distributions%20Systems, Paneltronics, What is Power Sign?, 2006, 2 pages.
Karlsson et al., IEEE Transactions on power electronics, DC bus voltage control for a distributed power system, Nov. 2003, pp. 1405-1412, v: 18, n:6, 8 pages.
Jaber A. Abu et al., Twenty-Fourth Annual IEEE Applied Power Electronics Conference and Exposition, Control Scheme for high-efficiency high-performance two-stage power converters, 2009, 7 pages.
Julio Garcia, 2009 Barcelona Forum on Ph.D. Reseach in Electronic Engineering, Efficiency improvements in autonomous electric vehicles using dynamic commutation of energy resources, 2009, 2 pages.
Reyneri et al., IAC-09.C3.2.8, A redundant power bus for distributed power management for a modular satellite, 2009, 8 pages.
M. Becherif et al., Vehicle power and propulsion conference (VPPC), 2010 IEEE, IEEE Power and Propulsion Conference (VPPC), Advantages of variable DC bus voltage for hybrid electrical vehicle, 201, pp. 1-6.
Jorge L. Duarte et al., IEEE Transactions on Power Electronics, Three-Port Bidirectional converter for hybrid fuel cell systems, 2007, vol. 22, No. 2, 8 pages.
Ian C. Evans et al., IEEE electric ship technologies symposium, High power clean dc bus generation using ac-link ac to dc power voltage conversion, dc regulation, and galvanic isolation, 2009, 12 pages.

(56) References Cited

OTHER PUBLICATIONS

Inki Hong et al., IEEE Transactions on computer-aided design of integrated circuits and systems, Power Optimization of variable-voltage core-based systems, Dec. 1999, vol. 18, No. 12, 13 pages.
F.H. Khan et al., ww.ietdl.org, IET Power Electronics, Bi-directional power manager management and fault tolerant feature in a −5kW multivlevel dc-dc converter with modular architecture, 2009, pp. 595-604, vol. 2, No. 5, 10 pages.
Matthew Alan Merkle, Thesis submitted to the faculty of Virginia Polytechnic Institute and State UniversityVariable bus voltage modeling for series hybrid electric vehicle simulation, Dec. 1997, 33 pages.
Leonid Fursin et al., Development of compact variable-voltage, bi-directional 100kw dc-dc converter, 2007, 9 pages.
Mat Dirjish, http://electronicdesign.com/Articles/Index.cfm?AD=1&ArticlesID-19515; Enginner seeks cure for common wall warts, Aug. 2008, 3 pages.
Green Plug, www.greenplug.us, One plug one planet, 2009, 7 pages.
M. Conti et al., SystemC modeling of a dynamic power management architecture, 6 pages.

\* cited by examiner

Power DC Power Loads

Battery Charging Manager

CONTROL MODULE FOR DC POWER NETWORK

1 RELATED APPLICATIONS

This application is a National Phase application filed under 35 U.S.C. § 371 of PCT International Application No. PCT/US2015/059712 with an International Filing Date of Nov. 9, 2015, which claims priority to provisional U.S. Patent Application Ser. No. 62/077,993 filed Nov. 11, 2014, entitled POWER DISTRIBUTION SYSTEM, and to provisional U.S. Patent Application Ser. No. 62/168,992, filed Jun. 1, 2015, entitled CONTROL MODULE FOR DC POWER NETWORK, each of which is incorporated herein by reference in their entirety and for all purposes.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © Protonex Technology Inc. 2015.

3 BACKGROUND OF THE INVENTION

3.1 Field of the Invention

The exemplary, illustrative technology herein relates to DC power networks that utilize smart rechargeable DC batteries and or dumb batteries connected to the DC power network over a smart cable or adaptor. More specifically the exemplary, illustrative technology herein relates to a battery charging manager operable on a DC power network.

3.2 The Related Art

Portable consumer electronic devices such as cell phones, computers, power tools, and the like are more and more powered by rechargeable direct current (DC) batteries that require frequent recharging. It is a typical problem that DC power is not readily available without a power converter that converts high voltage Alternating Current (AC) power signals such as grid or wall socket power to a lower voltage DC power source usable to recharge a rechargeable DC battery. The problem is further complicated when different DC battery types have different charging power requirements, e.g. different operating voltages and different current limits such that even if one has a power adaptor it is usually only compatible with a single rechargeable battery type or a single portable power device. As a result, consumers often own a different AC to DC power converter for every portable electronic device they own.

In specialized fields such as the military, public safety, healthcare, building construction, or the like the number of different DC battery types and power adaptors has become problematic to business owners and users who are required to maintain a huge inventory of rechargeable batteries and associated battery charging hardware. Moreover the work performed in these specialized fields is often in off-grid locations where AC grid power is not always available or reliable. As a result, workers are often forced to scavenge DC power from any available power source to recharge batteries and these may include recharging from vehicle batteries or vehicle power generators, recharging using portable photovoltaic devices, portable wind turbines, portable fuel cells, or other portable power sources, including gasoline powered electrical power generators.

In addition to the problem that each different battery type has different electro-mechanical charging interface equipment, many rechargeable DC batteries are smart batteries that store power information in digital format on the battery. The power information usually includes a battery type, the battery operating voltage ranges, the peak and average power amplitude that can be delivered by the battery, battery capacity (e.g. measured in watt-hours (Wh) or ampere-hours (Ahr)), a State of Charge (SoC), use time remaining, or the like, that relates to what portion of the battery capacity is still usable or how much battery use time is remaining, which indicates how much longer the battery can be used before its present charge capacity is used up), and other information such as charging voltage, charging current limits, or the like. In addition when the smart battery is paired with a particular device such as a particular cell phone or other electronic device, or more generally a specific power load, the power information stored on the smart battery may also include power information specific to the power load such as average and peak power load drawing by the power load. While power information stored on smart batteries or smart cables is intended to be read by a DC battery charger, different rechargeable batteries can store the power information in different formats and or use different network protocols to communicate with connected DC power chargers or the like.

Accordingly there is a need in the art to improve the utilization and management of rechargeable DC batteries such as by sharing DC power available from a plurality of DC batteries with a variety of power loads and to take advantage of a wider variety of input DC power sources to recharge DC batteries and power loads that include a rechargeable DC battery or a smart cable.

One conventional man-portable DC power manager disclosed in related U.S. Pat. No. 8,775,846 to Robinson et al., issued Jul. 8, 2014, entitled PORTABLE POWER MANAGER HAVING ONE OR MORE DEVICE PORTS FOR CONNECTING WITH EXTERNAL POWER LOADS discloses a charging method characterized by charging the most-full battery first and draining the least full battery first. More specifically when input power is not available and the only available power is from rechargeable batteries connected to the power manager, the power manager operates to select the rechargeable battery having the lowest state of charge as a primary source, which is then used to power loads as needed until it is fully discharged. Thereafter the power manager again operates to select the rechargeable battery having the lowest state of charge as a primary source, which is then used to power loads as needed until it is fully discharged. Similarly when input power becomes available, the power manager operates to select the rechargeable battery having the highest state of charge to charge first until it is fully charged, and then selects and charges the battery with the next highest state of charge until it is fully charged before charging other batteries.

One problem with the charging methods disclosed by Robinson et al. in '846 is that power is not uniformly distributed amongst connected DC batteries, leaving some batteries fully discharged at a critical time when input power availability is limited and recharging the most fully charged batteries first when input power becomes available. Moreover the methods disclosed by Robinson et al. in '846 fail to take battery capacity and or battery use time remaining into consideration when selecting which batteries to discharge or recharge. For example, a large capacity battery having a low state of charge may actually provide longer use time than a smaller capacity battery having a higher state of charge. Thus there is a need in the art to improve utilization of the collective start of charge and or remaining use time a DC power network as a whole to avoid fully discharging and or fully charging one battery at a time to avoid leaving some power loads without power.

4 SUMMARY OF THE INVENTION

The present invention addresses the problems with conventional DC power systems and associated rechargeable DC batteries described above by providing a more robust power distribution and control module. The improved power distribution and control module is configured to electrically interface and communicate with one or more DC power sources operably connected to input device ports and with a plurality of DC power loads operably connected to output device ports. The power sources and the power loads may include one or more rechargeable DC batteries either as standalone batteries or batteries associated with and powering a DC power load.

In particular the present invention provides a method for allocating electrical power received from external DC power sources to a plurality of external DC power devices according to various power allocation criteria. The method includes operating an energy management schema and a battery charging manager module using a controller data processing device. The controller data processing device periodically polls each device port to determine an instantaneous configuration of the power distribution and control module and then to group the instantaneous configuration by device type and other grouping criteria. Based on data received from or read from external power devices or measured by power sensors associated with device ports connected to external power devices, the processor determines a total instantaneous input power available from one or more DC power sources connected to the power distribution and module over one or more device ports. Additionally the processor determines a total instantaneous power demand or load associated with the plurality of external DC power devices connected to device ports. In particular the instantaneous power load associated with external power devices includes any combination of DC power loads, standalone rechargeable DC batteries and DC power loads that are powered by rechargeable DC batteries. In addition any internal power loads associated with operating the robust power distribution and control module are taken into account and allocated power from the total instantaneous input power available.

In a first step the processor/energy management schema allocates power to any internal power loads. In a second step the processor/energy management schema allocates some or all of the remaining total instantaneous input power to DC power loads. In a default embodiment, each DC power load is allocating enough power to meet its peak power demand or load. After allocating instantaneous input power to internal and external DC power loads any remaining portion of the total instantaneous input power is designated as Total Charging Power (TCP) which is allocated to the one or more of the plurality of rechargeable DC batteries that are connected to the power distribution and control module according to allocation criteria operating on the battery charging manager module. The processor/battery charging manager module is further operable to determine the instantaneous State of Charge (SoC) of each rechargeable DC battery connected to the power distribution and control module and the Average State of Charge (ASoC) of some or all of the rechargeable DC batteries connected to the power distribution and control module wherein in the ASoC is based on the instantaneous state of charge (SoC). In a preferred operating mode, the allocation criteria are configured to allocate the TCP in a manner that tends to equalize the SoC of each of the plurality of rechargeable DC batteries. In other operating modes the allocation criteria are configured to allocate a higher percentage of the instantaneous TCP to rechargeable DC batteries having an instantaneous SoC that is less than the ASoC.

5 BRIEF DESCRIPTION OF THE DRAWINGS

The features of the present invention will best be understood from a detailed description of the invention and example embodiments thereof selected for the purposes of illustration and shown in the accompanying drawings in which.

6 DEFINITIONS

Figure 1:
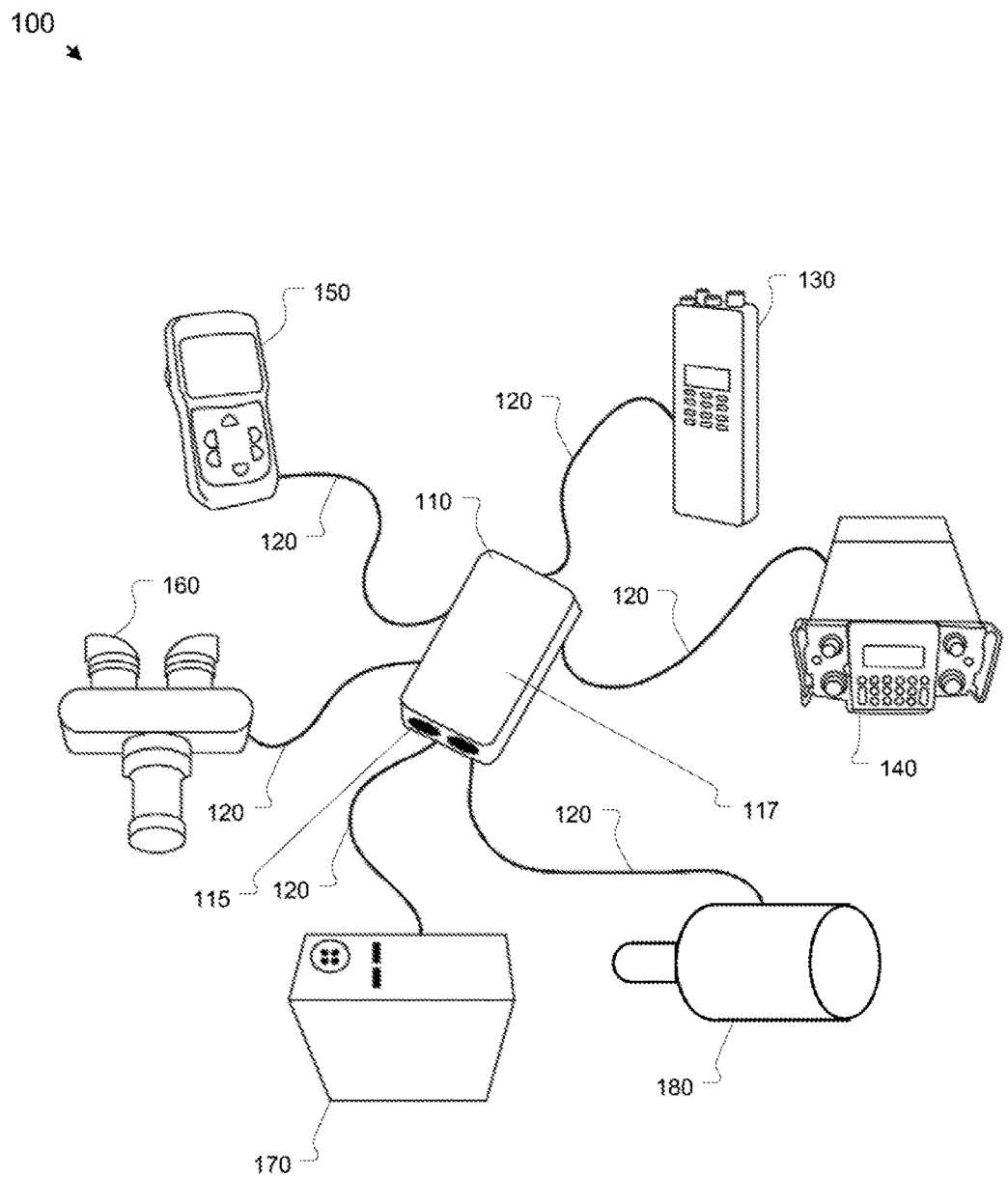
FIG. 1 depicts a non-limiting exemplary schematic diagram of a portable DC power network according to the present invention.

| TERM | DEFINITION |
| --- | --- |
| Smart rechargeable DC battery | A rechargeable DC battery configured to store power information about the rechargeable DC battery and or about a DC power load being powered by the smart DC battery in a digital format that is readable by other smart devices. |
| Standalone rechargeable DC battery | A rechargeable DC battery that is not associated with a particular power load. |
| Peak power load | The highest DC power load that a DC power device is expected to draw at a given instance. |

6.1 Item Number List

The following item numbers are used throughout, unless specifically indicated otherwise.

| # | DESCRIPTION |
|---|---|
| 100 | DC Power network |
| 110 | Soldier power manager |
| 115 | Device port |
| 117 | Electronic enclosure |
| 120 | Wire cable |
| 130 | DC power load |
| 140 | DC power load |
| 150 | DC power load |
| 160 | DC power load |
| 170 | DC power source |
| 180 | DC power source |
| 200 | Power distribution and control module |
| 210 | Power bus |
| 220 | Controller data processing device |
| 225 | Controller network interface device |
| 230 | Controller memory module |
| 231 | Power channel |
| 232 | Power channel |
| 233 | Power channel |
| 234 | Power channel |
| 235 | Power channel |
| 236 | Power channel |
| 240 | Controllable switching element |
| 241 | DC to DC power converter |
| 242 | DC to DC power converter |
| 243 | DC to DC power converter |
| 244 | DC to DC power converter |
| 245 | DC to DC power converter |
| 246 | Controller network interface device |
| 247 | Communication channel |
| 248 | Communication channel |
| 252 | Electrical sensor |
| 254 | Electrical sensor |
| 256 | Electrical sensor |
| 258 | Electrical sensor |
| 260 | Electrical sensor |
| 262 | Electrical sensor |
| 270 | User interface device |
| 285 | Internal power load |
| 300 | Power distribution and control module |
| 305 | Input device port |
| 310 | Output device port |
| 315 | Power distribution network |
| 320 | Electronic control module |
| 325 | Controller data processing device |
| 330 | Controller memory module |
| 335 | Controller network interface device |
| 340 | DC power source |
| 345 | DC power load |
| 350 | Input power sensor |
| 355 | Output power sensor |
| 360 | DC to DC power converter |
| 365 | Input terminal |
| 370 | Output terminal |
| 375 | Communication channel |
| 385 | Internal power load |
| 390 | Controllable switch |
| 395 | User interface device |
| 397 | Power point tracking module |
| 400 | Power distribution and control module |
| 402 | Electrical power connector |
| 404 | Electrical power connector |
| 405 | Device port |
| 406 | I/O port |
| 407 | I/O port |
| 408 | Communication channel |
| 410 | External power device |
| 412 | Smart rechargeable DC battery |
| 415 | Smart wire cable or smart adapter |
| 420 | Power channel |
| 421 | Power channel |

| # | DESCRIPTION |
|---|---|
| 425 | Controller network interface device |
| 430 | Controller data processing device |
| 435 | Controller memory |
| 440 | Power sensor |
| 445 | Controllable switching element |
| 446 | DC to DC power converter |
| 450 | Battery data processing device |
| 450a | Cable data processing device |
| 455 | Battery memory |
| 455a | Cable memory module |
| 460 | Battery network interface device |
| 460a | Cable network interface device |
| 465 | DC Power load |
| 470 | Chemical energy storage device |
| 475 | Power channel |
| 476 | Power channel |
| 500 | Flow diagram |
| 505 | Map DC network |
| 510 | Determine instantaneous input and output power |
| 515 | Rank devices according to device priority |
| 520 | Allocate power to DC power loads |
| 600 | Flow diagram |
| 605 | Determine TCP |
| 610 | Determine SoC for all DC batteries |
| 615 | Calculate ASoC |
| 620 | Order DC batteries by SoC low to high |
| 625 | Allocation loop |
| 630 | Set counter |
| 635 | Compare Bi to ASoC |
| 640 | Charge Bi |
| 645 | Reduce TCP |
| 650 | Is TCP <0 |
| 655 | Increase counter |
| 660 | Is counter < N |
| 665 | Charge uncharged DC batteries |

7 EXEMPLARY SYSTEM ARCHITECTURE

7.1 Power Distribution and Control Module Having a Power Bus

Referring now to FIG. 1, a first exemplary portable DC power network (100) according to the present invention includes a soldier power manager (110), described below as a power distribution and control module (200) configured to electrically interface with a plurality of external DC power devices. In the present non-limiting exemplary embodiment the soldier power manager (110) is carried by an infantry soldier, e.g. attached to the uniform worn by or the pack carried by the soldier. The plurality of external power devices include various DC power loads (130, 140, 150, 160) and one or more DC power sources (170) and or (180), not all of which are necessarily connected at the same time. Example soldier power manager devices and operating methods are described in commonly assigned U.S. Pat. No. 8,775,846, entitled PORTABLE POWER MANAGER, U.S. Pat. No. 8,638,011, entitled PORTABLE POWER MANAGER OPERATING METHODS, U.S. Pat. No. 8,633,619, entitled POWER MANAGERS AND METHODS FOR OPERATING POWER MANAGERS, and in U.S. Pat. Appl. Pub. No. 20140103720A1, entitled POWER MANAGERS AND METHODS FOR OPERATING POWER MANAGERS, all by Robinson et al. and all of which are incorporated herein by reference in their entirety for all purposes.

The external power devices include one or more DC power loads such as wireless communications devices, a navigation device and a night vision system. Generally a power load consumes electrical power to perform a task. Typically each DC power load (130, 140, 150, 160) includes its own rechargeable DC battery associated therewith, often mounted inside a housing of the external DC power load. Preferably the rechargeable DC battery is a smart battery that includes a digital communication interface (e.g. a network interface device) and at least a programmable or non-volatile memory module provided on the smart battery to store digital information related to the battery itself and or related to the load being powered by the battery. Typically the stored digital information includes power characteristics of the load and the rechargeable battery in a format that is readable by the soldier power manager (110).

In some cases the soldier power manager (110) is used to recharge rechargeable DC batteries that are standalone devices not associated with or actively powering a power load. In such cases only the DC battery is connected to a device port and all power delivered to the DC battery by the soldier power manager (110) is substantially stored by the standalone battery. In other example operating modes, a rechargeable DC battery is electrically interfaced to a device port and a power load is electrically interfaced with a DC battery. In such cases, the power load, when set in a non-operating mode, may cause the associated rechargeable DC battery to be treated like a standalone rechargeable DC battery.

In one example use scenario, a reliable DC power source becomes available and is connected to an input port of the soldier power manager (110). Thereafter a user or a plurality of users connects a plurality of standalone rechargeable DC batteries to the soldier power manager (110) for rapid recharging. Thus depending on configurations and operating modes of external DC power devices, which can be changed by a user, an external power load connected to a device port can be characterized as a power load or as a standalone rechargeable DC battery and the energy management schema of the present invention treats these two cases differently.

The external power devices also include one or more DC power sources (180) such as an electrochemical power generator or fuel cell, a portable mechanical power generator such as a portable wind or portable water turbine, a fossil fuel powered engine, or the like, driving a DC power generator, an electrically powered DC power generator, e.g. a DC power converter connected to an AC power grid, or the like. Additionally any electrochemical energy storage device such as any one of the smart rechargeable DC batteries described above, a vehicle battery system, or the like, are also usable as a DC power source (170) operable to deliver input power to the soldier power manager (110).

In the present first example embodiment the soldier power manager (110) includes a plurality of device ports (115) and each external power device is electrically interfaced to the soldier manager (110) by a wire cable (120) or adaptor, electrically interfaced to one of the device ports (115). The wire cable includes an electrical connector at each end thereof, not shown, with one end of the wire cable (120) configured to electrically interface with a device port (115) and an opposing end of the wire cable (120) configured to electrically interface with a port provided on the external power device, not shown. Preferably ports provided on external power devices are input output (I/O) interface ports having a bidirectional power channel and a bidirectional digital communication channel; however, as will be described below, other configurations are usable without deviating from the present invention.

Figure 2:
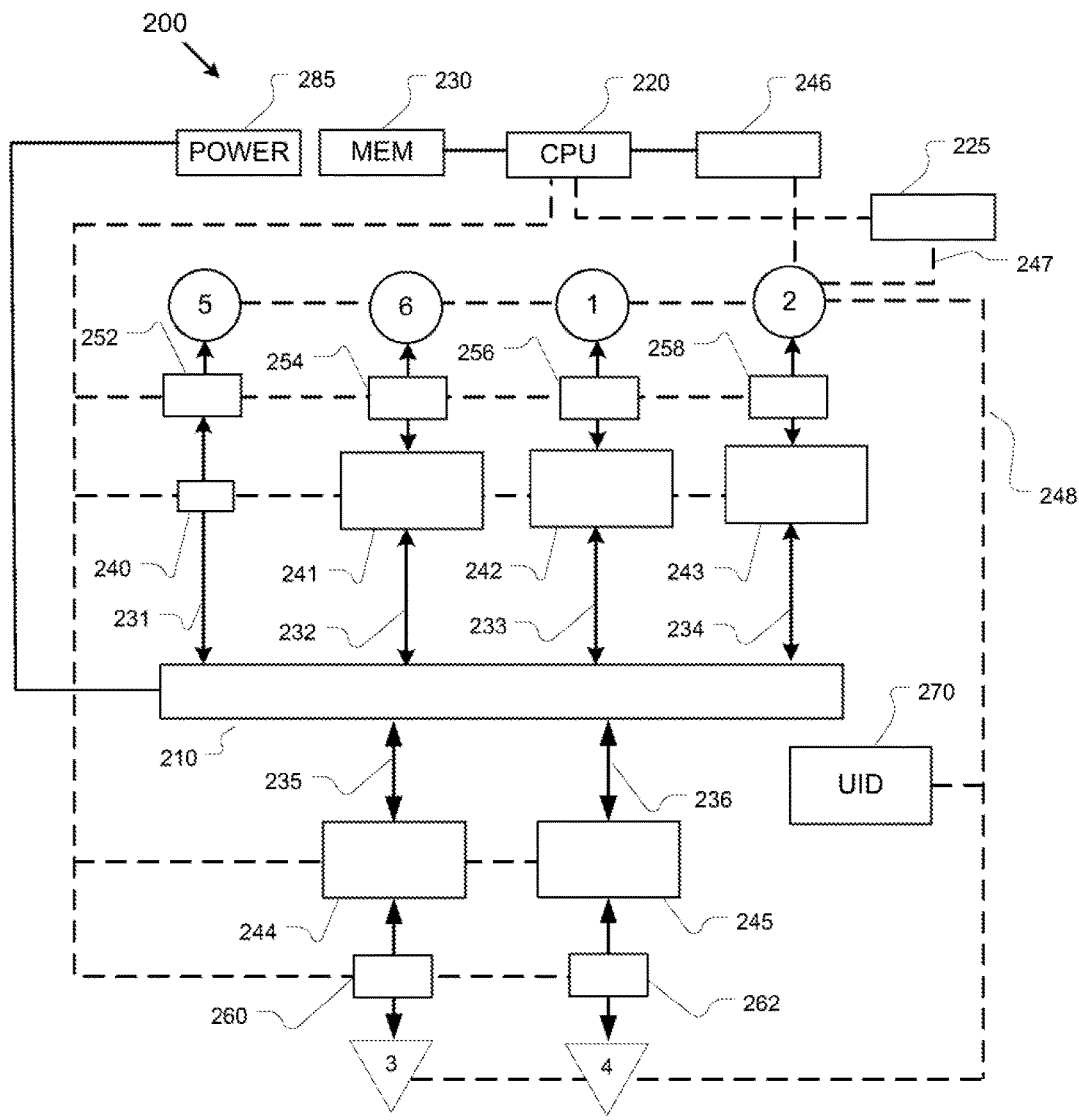
FIG. 2 depicts a non-limiting exemplary schematic diagram depicting a first embodiment of a DC power distribution and control system according to the present invention.

Referring now to FIG. 2, a non-limiting first exemplary power distribution and control module (200) according to the present invention is shown schematically. The power distribution and control module (200) comprises electrically conductive conduits and electrical control elements (circuit elements) suitable for exchanging electrical power and communication signals with external power devices connected to the power distribution and control module (200) over device ports.

Preferably the actual hardware making up the power distribution and control module (200) is housed inside a weather proof portable electronic enclosure (117), shown in FIG. 1, that includes six device ports labeled (1-6). Each device port (1-6) comprises an electrical connector mechanically installed through and structurally supported by a wall of the electronic enclosure (117) such that each device port provides an electrical interface for connecting an external power device to the power distribution and control system (200) using a wire connector that includes a power channel. Preferably, all the device port connectors are multi-pin connectors of the same type; however, the number of pins and the functionality of each multi-pin connector may vary from port to port. Any number of device ports greater than two is usable without deviating from the present invention. Additionally, different connector configurations may be provided in alternate embodiments. In other alternate embodiments, device ports may have a variety of different connector configurations, including wireless options such as providing an electrical power interface across contacting conductive contact pads, providing an electrical power interface across wireless inductive energy transfer terminals, providing printed circuit runs or traces on a support substrate, and providing wireless communication interfaces and other electrical interfaces, without deviating from the present invention. In the power distribution and control module (200), each device port (1-6) connects to a common electrical conductor such as a power bus (210). Other power distribution topologies such as star network, chain or mesh network, or the like usable to connect each of the six device ports to a common conductor are usable without deviating from the present invention.

The power distribution and control module (200) includes a controller data processing device (220) and associated controller memory module (230). The controller data processing device (220) and controller memory module (230) are preferably housed inside the electronic enclosure (117) and in some embodiments the controller memory module (230) may be incorporated within the controller data processing device (220) or may comprise a removable memory device removable from the electronic enclosure (117) by a user. In any case at least a portion of the controller memory is preferably non-volatile. Example controller data processing devices (220) include a central processing unit (CPU), an integrated microprocessor, a microcontroller, or a field-programmable gate array (FPGA). Other local and or distributed digital data control systems or system elements are usable without deviating from the present invention. An example electronic enclosure (117) comprises a light weight metal or plastic housing formed with water tight seams and configured with electro-magnetic wave shielding and electrical grounding elements.

The controller data processing device (220) is electrically connected with elements of the power distribution system and connects with each of the device ports (1-6) through a controller network interface device (246) or other digital communications interface. A communication channel (248), shown as a broken line, interconnects the controller network interface device (246) with each of the device ports (1-6). In alternate embodiments the controller network interface device (246) is incorporated within the controller data processing device (220). The communication channel (248) extends through each device port and preferably extends through a wire cable (120) connected to the device port to an I/O port of an external power device connected to the device port over the wire cable, detailed below and shown in FIG. 4. Thus the communication channel (248) associated with each device port is electrically interfaced with the controller data processing device (220) operating on the power distribution and control module (200) and with an external digital data memory and or external digital processing device operating on or associated with whatever external power device is electrically interfaced to the device port.

Preferably, each external power device connected to each device port is a smart device or is connected to the device port over a smart cable wherein the smart device and or the smart cable includes an external digital data interface such as an external digital processor, an external digital memory, and or the like, readable by or otherwise in communication with the controller data processing device (220). Ideally the device type and power and operating characteristics of each external device are stored on the external digital data interface in a format that is readable by the controller data processing device (220).

7.1.1 Operating Mode

In a non-limiting operating mode example, the controller data processing device (220) periodically maps the power network by polling each device port to determine if an external power device is connected to the device port and if so to determine a device type, such as, a power load, a power source, or a rechargeable battery, or a combination, and to determine power characteristics of each external power device such as its operating voltage, peak and average power demand or peak and average power availability, for a power source, and other data such as for rechargeable DC batteries the battery charge storage capacity, its State of Charge (SoC), and various charging parameters. Once the network configuration is known, an energy management program or schema operating on the controller data processing device (220) configures elements of the power distribution and control module (200) to receive input power from connected power sources and to distribute output power to connected power loads and or rechargeable DC batteries. The DC network is periodically remapped (e.g. at a refresh rate such as every 20 to 100 msec), and power is redistributed as needed as network conditions change.

In a preferred embodiment, the controller data processing device (220) communicates with operably connected power devices and smart cables using network packeted data using the SMBus network protocol, which is widely used to store power characteristic information on smart power devices. Additionally, the controller network interface device (246) or additional controller network interface devices can support other communication protocols on a common bus controller to communicate with external power devices using other communication protocols such as the Inter-Integrated Network (IIC) communication protocol or the Universal Serial Bus (USB) communication protocol. In some embodiments, the power distribution and control module (200) may include wireless controller network interface devices and associated transceivers for wireless communication with comparably equipped external power devices or smart cables and smart power devices using a wireless network communication protocol such as WiFi, WiMax, Bluetooth, or others.

In the example embodiment the power distribution and control module (200) includes a second controller network interface device (225) such as a USB communication interface device disposed between the controller data processing device (220) and the device port (2) and the device port (2) includes a first SMBus configured data communication channel (248) and a second USB configured data communication channel (247) suitably configured to communicate with USB configured devices operably connected with device port (2).

The controller memory module (230) is used to store and periodically refresh state information, energy management schema information, DC network configuration data, operating programs such as firmware and/or software, and other digital data, including look-up tables or the like listing power data for commonly used rechargeable DC batteries and or power loads that is used by the controller data processing device (220) to operate the power distribution and control module (200) and to manage power exchanges with connected external power devices according to pre-defined operating modes.

In the present non-limiting example embodiment, each device port (1-6) can be operably disconnected from the power bus (210) or operably connected to the power bus (210) over a power channel such as (231, 232, 233, 234, 235, 236). Generally the power bus (210) is operated at a substantially constant bus voltage. While the bus voltage is preferably centered at a desired DC voltage the bus voltage is variable over an operating range depending on fluctuations in power conditions on the overall DC power network. However in some operating modes, the bus voltage operating range may be stepped up or stepped down to improve power distribution efficiency. See provisional U.S. Patent Application Ser. No. 62/077,993, filed Nov. 11, 2014, entitled Power Distribution System which is incorporated herein by reference in its entirety for all purposes. However once a bus voltage operating range is established, power input to the power bus and power output from the power bus are at the instantaneous bus operating voltage unless the input or output voltage is modified by a power converter or the like.

The power channels (231, 232, 233, 234, 235, 236) each comprise an electrically conductive element such as a wire, a printed circuit board trace on a support substrate, or another conductive pathway that extends from a single device port to the power bus. Each power channel includes an operable switch or other current modulating device operable by the controller data processing device (220) disposed along the power channel to operably connect the associated device port to the power bus (210) or operably disconnect the associated device port from the power bus (210) in response to actuating the operable switch. Each power channel optionally includes an electrical sensor (252, 254, 256, 258, 260, and 262) in communication with the controller data processing device (220) and disposed between the device port and the operable switch. The electrical sensors are operable to sense voltage, current, and or power amplitude and to transmit a sensor signal to the controller data processing device (220). In any case each sensor communicates a sensor signal to the controller data processing device (220) and the controller data processor interprets the sensor signal to determine voltage, power and current amplitude at the sensor location.

Some of the power channels, e.g. (232, 233, 234) include an output DC to DC power converter (241), (242), (243) in communication with the controller data processing device (220). Each output DC to DC power converter is disposed along a power channel between the power bus (210) and a corresponding device port or between the power bus and corresponding electronic sensors e.g. (254) if so equipped. Other of the power channels may include input DC to DC power converters (244), (245), each in communication with the controller data processing device (220). Each input DC to DC power converter is disposed along a power channel between the power bus (210) and corresponding device ports or between the power bus and corresponding electronic sensors e.g. (260) if so equipped. Each input power converter is operable by the controller data processing device (220) to step up or step down a power signal voltage as needed to match an input power signal voltage to the bus voltage. Each output power converter is operable by the controller data processing device (220) to step up or step down a power signal voltage as needed to match an output power signal to a voltage that is compatible with an external power device receiving the output power signal. Each power converter is also operable to modulate DC current amplitude substantially between zero and the full current amplitude of the power signal being modulated. The level of DC current modulation is controlled by the controller data processing device (220) and the energy management schema in a manner that distributes and manages power signals at power amplitude levels that are safe and efficient. Moreover since each power converter is operable as a DC current attenuator, power channels that include a DC to DC power converter (241), (242), (243), (244), (245) do not require a separate operable switch operable to connect the device port to or disconnect the device port from the power bus (210) but a switch may be included without deviating from the present invention.

In an alternative non-limiting example embodiment, one device port has a first power channel, e.g. (231) associated with port (5) that includes a controllable switching element (240) and no power converter. In this configuration port (5) is usable as an input port or an output port for external power devices having an operating voltage range that is compatible with the bus voltage, e.g. to connect any external power device to the power bus that can be connected to the power bus (210) without power conversion or current attenuation. In an alternative non-limiting example embodiment, each device port has a first power channel that includes a controllable switching element, e.g. (240), and no DC to DC power converter such as to create a DC power network wherein all the external devices are operable at the bus voltage. In the same, non-limiting example embodiment, some or all or the device ports may include a second power channel extending to the power bus wherein the second power channel either includes or can be routed through an input or an output power converter as needed to make an appropriate power conversions.

In an exemplary non-limiting operating mode, the power bus (210) is operated at a voltage range substantially centered at 15 VDC. The output DC to DC power converters (241), (242) and (243) are operable by the controller data processing device (220) to make an output voltage conversion from the power bus voltage of 15 VDC to any voltage between 10 and 24 volts DC. Similarly the input DC to DC power converters (244) and (245) are operable by the controller data processing device (220) to make an input voltage conversion from any voltage between 4 and 34 VDC to the power bus voltage of 15 VDC. In one example embodiment, a portable military radio connected to the power bus has an operating voltage range of 10-14 VDC, with an average idle mode power demand of 6 watts with an idle current of 0.4 Amp and a peak power demand of 20 watts in transmit mode with a peak current of 2 Amp.

An internal power load (285) powers elements of the power distribution and control module (200) as required. The internal power load (285) may comprise a rechargeable battery which is charged using a portion of the input power available from the power bus (210). The internal power load (285) comprises an internal or system power load which includes whatever power load is demanded by the controller data processing device (220), controller memory module (230) and controller network interface devices (246) and (225) and by other devices including controllable switching elements (240), DC to DC power converters, e.g. (241), (244), the user interface device (270), and any other system elements that consume power. The internal power load (285) may include a power or voltage regulator such as a linear regulator or a shunt regulator configured to condition power signals drawn from the power bus as needed to power electronic control elements of the power distribution and control module (200). An operating program that includes an energy management schema operates on the controller data processing device (220) and controller memory module (230).

Preferably, the power distribution and control module (200) includes a user interface device (270) in communication with the controller data processing device (220). The user interface device (270) includes a video display operable to display text and/or graphic symbols or other visual indicators such as indicator lights or the like as well as a user input device such as keypad elements or the like responsive to user inputs. The user interface device (270) is operable to display various indicators related to operating parameters of the power manager including status, error codes, menus, or the like and to respond to user input sections such as menu choices or the like.

7.2 Power Distribution and Control Module Having a Single Input Port

Figure 3:
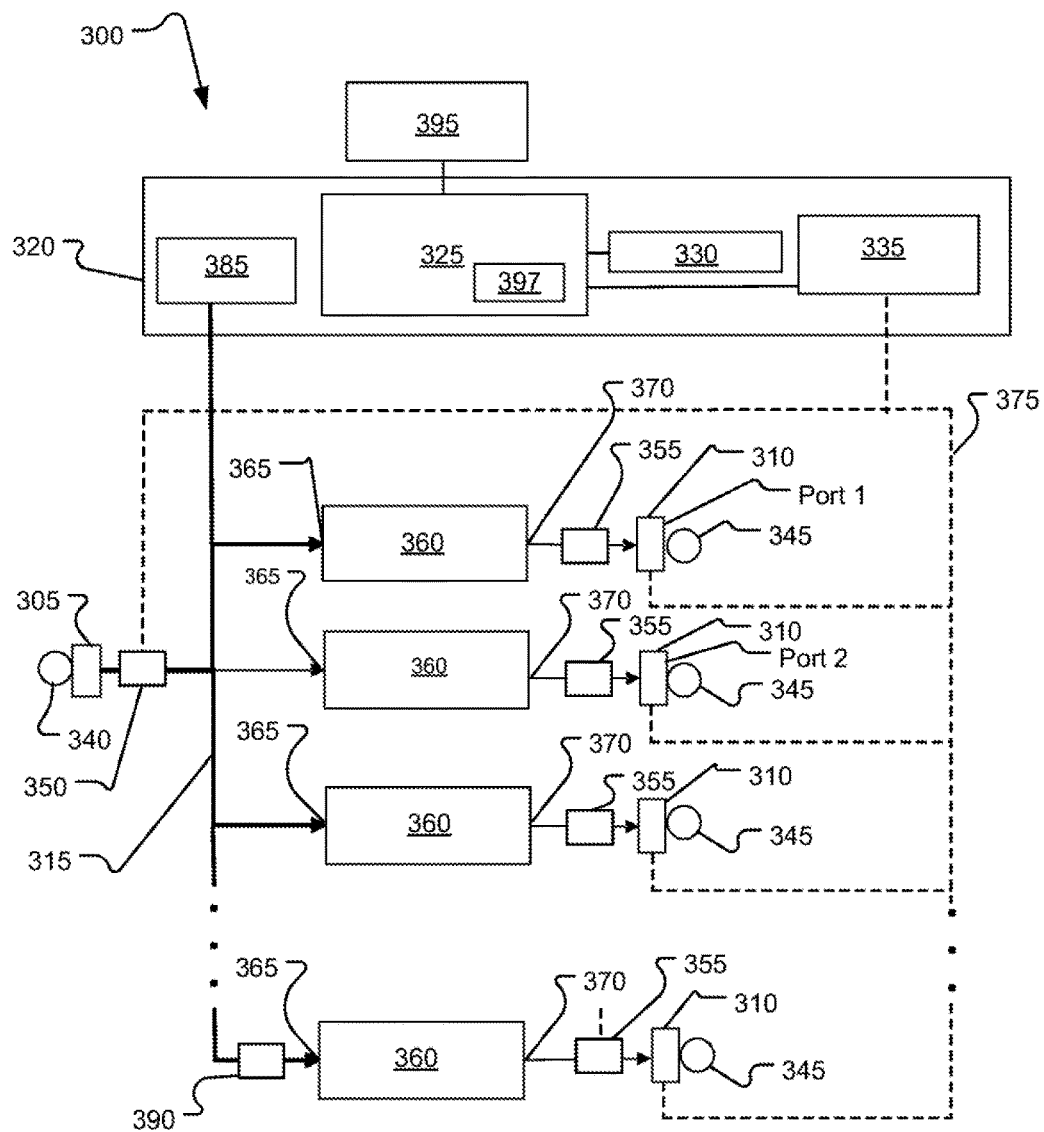
FIG. 3 depicts a non-limiting exemplary schematic diagram depicting a second embodiment of a DC power distribution and control system according to the present invention.

Referring now to FIG. 3 a second exemplary non-limiting DC power distribution and control module (300) according to the present invention includes an electronic control module (320) and a power distribution network (315) configured to electrically interface with a plurality of external power devices. In the present non-limiting exemplary embodiment the power distribution and control module (300) is a portable DC battery charging system suitable for scavenging DC power from an input DC power source (340) and distributing the available DC input power to one or more of a plurality of output DC power loads (345), e.g. rechargeable DC batteries, connected to output device ports (310).

The power distribution and control module (300) is operable to receive DC input power from an external DC power source (340) connected to an input device port (305). Input DC power source (340) may provide input power over a range of input DC voltages, e.g. ranging between about 2 to 60 VDC with an associated input current amplitude range of between about 0 to 20 A providing a usable input power range of about a few microwatts to about 1.2 Kilowatts. The DC power distribution and control module (300) is further configured to include a plurality of DC to DC power converters (360) with one DC power converter dedicated to each output device port (310). The DC to DC power converters (360) are each operable to receive a power signal at whatever input voltage is provided by the input DC power source (340) and to convert the input voltage to an output voltage matched to an operating voltage of whatever DC power load (345) is being powered by the power channel associated with the DC to DC power converter (360). Thus each DC to DC power converter (360) is operable to convert the input voltage range of 2 to 60 VDC to an output voltage matched to an operating voltage of whatever external power device is connected to the output device port (310) associated with the power converter. Alternately the power distribution and control module (300) can be configured to operate with other input and output DC voltage ranges without deviating from the present invention. A related power distribution system and operating method is described in commonly assigned U.S. Provisional Pat. No. 62/077,993, entitled POWER DISTRIBUTION SYSTEM, filed Nov. 11, 2014 by David Long which is incorporated herein by reference in its entirety for all purposes. Additionally, a related commercially available portable battery charger is available from Protonex Technology Corporation of Southborough Mass. under the product name Advanced Battery Charger.

The power distribution and control module (300) includes an input device port (305) and a plurality of output device ports (310) and each device port is configured to electrically interface with an external power device. External power devices connectable to device ports include a DC power source (340) electrically interfaced with a single input device port (305). The DC power source (340) may include an electrochemical power generator or fuel cell, a portable mechanical power generator such as a portable wind, wave or water turbine, a fossil fuel powered engine driving a DC power generator or a battery powered by the DC power generator, an electrically powered DC power generator (e.g. a DC power converter connected to an AC power grid), or the like. Additionally the DC power source (340) may comprise a smart rechargeable DC battery or power load that includes a smart rechargeable DC battery.

The external power devices include a plurality of DC power loads (345) connected to one or more output device ports (310). The DC power loads (345) may comprise one or more smart rechargeable DC batteries connected to the power distribution and control module (300) for recharging. In one non-limiting exemplary embodiment some or all of the smart rechargeable DC batteries are standalone devices not associated with a power load. In other non-limiting exemplary embodiments some or all of the smart rechargeable DC batteries are interfaced with a power load which may be operating or idle while the smart rechargeable battery is connected to the output device port (310).

Generally a power load consumes electrical power to perform a task. Typically each DC power load (345) that is not a standalone smart rechargeable DC battery includes its own rechargeable DC battery associated therewith, often mounted inside a housing of the DC power load (345). Preferably the rechargeable DC battery is a smart battery that includes a digital communication interface, e.g. a battery network interface device and at least a programmable, non-volatile battery memory module provided on the smart battery to store digital information related to the battery itself and or to the load being powered by the battery. Typically the stored digital information includes power characteristics of the power load and power characteristics of the rechargeable DC battery in a format that is readable by the power distribution and control module (300). DC power loads (345) may include wireless communications devices, portable computers, navigation devices, DC lighting, power tools, heaters, food preparation devices, motors, fans, or the like such as may be encountered in a DC powered vehicle or other DC powered system.

When the power distribution and control module (300) is used to recharge a standalone rechargeable DC battery, substantially all power delivered to the standalone DC battery by the power distribution and control module (300) is stored by the battery. When a DC power load (345) is interfaced with a smart DC rechargeable battery connected to an output device port (310) and the power load is not operating, e.g. the power load is turned off or in idle mode, the battery management module of the present invention may treat such a smart DC battery as a standalone battery instead of a power load.

In one example use scenario, a reliable DC power source becomes available and the user or users connect a plurality of rechargeable DC batteries to output device ports (310) of the power distribution and control module (300) for rapid recharging. If the rechargeable DC batteries are associated with a power load, the power load may be set in a non-operating mode (e.g. by a user) in order to ensure that the rechargeable battery will be fully charged. Thus depending on user selectable configurations and operating modes of DC power loads (345), each DC power load (345) connected to an output device port (310) can be characterized as a power load or as a standalone rechargeable DC battery and the battery management module of the present inventions is operable treat these two cases differently.

The input device port (305) and plurality of output device ports (310) are each formed by an electrical power connector supported by a housing wall, or the like, of an electronic enclosure, not shown. Preferably each power connector includes a power channel and a communication channel, although in some embodiments the communication channel may comprise a wireless communication network wherein external power devices are operating as nodes on the wireless network. In some embodiments, the communication channel and power channel is the same channel with communication signals transmitted over the power channel. Generally a single power channel comprises two wires or two conductive conduits, e.g. one connected to a positive power terminal and the other connected to a negative power terminal. Similarly a single communication channel may comprise a wire pair (two wires).

Each external power device e.g. DC power source (340) and output DC power load (345) connects to the device port connector using a wire connector or adaptor disposed between the device port and the external power device. The wire connector or adaptor includes an electrical power connector, or the like, at each end thereof. One end of the wire connector or adaptor is electrically interfaced with the device port and the other end of the wire connector or adaptor is electrically interfaced with the external power device as further detailed below and shown in FIG. 4.

The mating electrical power connector may be associated with a wire cable, a power adaptor, or may be incorporated into the external power device. If a wire cable or a power adaptor is used, the wire cable or adaptor extends between an input device port (305) or output device port (310) and the external power device. The external power devices may include an input output (I/O) port suitably formed to interface with the electrical power connector provided by the wire cable or adaptor. Preferably the external power device I/O port and the wire cable or adaptor includes a power channel and a communications channel.

The power distribution and control module (300) includes a power distribution network (315) electrically interconnecting the input device port (305) with each of the plurality of output device ports (310). The power distribution network (315) comprises a plurality of conductive pathways such as may be formed by individual wires or branched conductive pathways such as traces formed on a printed circuit board, or the like. Each conductive pathway extends from the input device port to one of the output device ports but a portion of the conductive pathway proximate to the input device port may be shared by all of the plurality of conductive pathways. In the present example the power distribution network (315) connects each output device port (310) to the input device port (305) over a different DC to DC power converter (360).

The power distribution network (315) includes a plurality of unidirectional DC to DC power converters (360) with one DC to DC power converter (360) associated with each output device port (310). Each DC to DC power converter (360) includes an input terminal (365) which is in electrical communication with the input device port (305) over the power distribution network (315). Thus the voltage of the input power signal at each of the DC to DC power converter input terminals (365) is always substantially equal to the instantaneous voltage of the DC power source (340) connected to the input device port (305).

Each of the plurality of DC to DC power converters (360) includes an output terminal (370). Each output terminal (370) is connected to a different one of the plurality of output device ports (310). Thus each output device port (310) is associated with a dedicated DC to DC power converter (360) operable to convert the DC voltage present at the input terminal (365) to a DC voltage that is matched to an operating voltage range of whatever DC power load (345) is electrically interfaced with the output device port (310) associated with the DC to DC power converter (360). The DC to DC voltage conversion may step up (increase) the input voltage, or step down (decrease) the input voltage, depending on which is needed to match an operating voltage range of a DC power load (345) interfaced with the corresponding output device port (310). The controller data processing device (325) manages voltage conversion setting of each of the DC to DC power converters (360) by continuously adjusting the conversion settings to convert instantaneous input voltage at input terminals (365) to desired output voltages at each output device port (310).

Preferably each DC to DC power converter (360) is further operable to modulate current amplitude of a power signal passing there through. Preferably the current amplitude can be modulated substantially continuously between 0 and 100% of the input current amplitude at input terminal (365); however current amplitude can be modulated non-continuously using discrete current amplitude steps between 0 and 100% of the input current amplitude without deviating from the present invention. Additionally each DC to DC power converter (360) can be operated to modulate current amplitude even when no voltage conversion is required. Thus each DC to DC power converter (360) is operable as a switch when the DC to DC power converter (360) is configured to attenuate current amplitude to substantially zero current amplitude in order to substantially disconnect the associated output device port (310) from the power distribution network (315). Additionally depending on how the DC to DC power converter is controlled each of the DC to DC power converters (360) is operable as a current or a power limiter to limit either current amplitude or power amplitude to a preset maximum and or to limit current or power amplitude to a preset range by establishing maximum and minimum current amplitude limits.

Optionally each branch of the power distribution network (315) may include a controllable switch (390) provided in addition to the DC to DC power converter (360) on the same branch. The controllable switch (390) is in communication with and controlled by the controller data processing device (325) and is disposed along any branch of the power distribution network (315) that leads to an output device port (310). Each controllable switch (390) is controllable to selectively disconnect and reconnect a single output device port (310) from the power distribution network (315). In various embodiments the controllable switch (390) is disposed between the input port (305) and the DC to DC converter input terminal (365) or between the DC to DC converter output terminal (370) and the output power sensor (355).

The power distribution and control module (300) includes an electronic control module (320). The electronic control module includes a controller data processing device (325), a controller memory module (330) in communication with the controller data processing device (325) and a controller network interface device (335) also in communication with the controller data processing device (325). The controller memory module and or controller digital communication device interface can be incorporated within the controller data processing device (325).

An internal power load (385) powers elements of the electronic control module (320) and other electronic control elements of the power distribution and control module (300) as required. The internal power load (385) may comprise a rechargeable battery which is charged using a portion of the input power received through the input device port (305). Otherwise the internal power load (385) comprises an internal or system power load powered by a portion of the input power received through the input port. The internal power load (385) may include a power or voltage regulator such as a linear regulator or a shunt regulator configured to condition power signals as needed to power electronic control elements of the power distribution and control module (300). An operating program that includes an energy management schema operates on the controller data processing device (325) and controller memory module (330). The operating program and energy management schema manage communication with connected external power devices as well as manage operating modes of active control elements such as the DC to DC power converters (360), any controllable switches (390), and passive elements including input power sensor (350), output power sensors (355), the internal power load (385) and the controller memory (330) to distribute input power to selected power loads. In addition the energy management schema includes a battery manager module operable to charge standalone smart DC batteries connected to any of the output device ports (310).

A communication channel (375) shown as dashed lines, extends from the controller network interface device (335) to each of the device ports and is operable to exchange digital, e.g. packet based, communication signals between the controller data processing device (325) and each external power device operably connected to an input device port (305) or an output device port (310). In a preferred embodiment the communication channel (375) is a SMbus network typically used to communicate with smart batteries and other external power devices and or electronic control elements. Alternately or additionally the power distribution and control module (300) can use other or additional controller network interface devices (335) operating with different network protocols without deviating from the present invention. Some example other communication protocols include the Inter-Integrated Network (IIC) communication protocol, the Universal Serial Bus (USB) communication protocol, the IEEE 802.15.1 Blue Tooth communication protocol, the IEEE 802.3 Ethernet communication protocol, the IEEE 802.11 WiFi communication protocol, the IEEE 802.16 WiMax communication protocol, one of the IEEE 802.20 Mobile Broadband Wireless Access communication protocols, which includes cellular radio network data communications, or one or more serial or parallel communications device protocol such as RS-232 or RS485, the internet protocol or other data communication protocols that permit bi-directional (full-duplex or half-duplex) data transfer.

Other electronic control elements of the power distribution and control module (300) are in communication with the electronic control module (320) and controlled by the controller data processing device (325) operating program and energy management schema. These include the DC to DC power converters (360), input power sensors (350), output power sensors (355), controllable switches (390), temperature sensors, (not shown) or the like, operating in cooperation with the electronic control module (320). While communication between the other electronic control elements and the controller data processing device (325) may be over the communications channel (375), a separate electrical communication for internal devices is used for digital and or analog signal exchange between the controller data processing device (325) and any other electric elements associated with the power distribution and control module (300).

An input power sensor (350) in communication with the controller data processing device (325) is provided to sense substantially instantaneous input voltage and input power or current amplitude proximate to the input device port (305). The input power sensor (350) transmits an input power signal to the controller data processing device (325) which interprets the input power signal as instantaneous voltage and power amplitude each of which is used to configure the power distribution control module (300) to distribute the instantaneous input power amplitude according to polices of the energy management schema.

A plurality of output power sensors (355) each in communication with the controller data processing device (325) is provided with one output power sensor (355) associated with each output device port (310) to sense substantially instantaneous output voltage and output power amplitude proximate to each of the output device ports (310). The output power sensors (355) each transmit an output power signal to the controller data processing device (325) which interprets each output power signal as instantaneous voltage and power amplitude. The output power signals are each used to configure and reconfigure the DC to DC power converters (360) and other elements of the DC power network to manage the instantaneous output power amplitude at each output device port (310) according to polices of the energy management schema. The input power sensor (350) and each output power sensor (355) comprise any sensor or module that is operable to determine any two of instantaneous voltage, instantaneous current amplitude, and instantaneous power amplitude.

The power distribution and control module (300) includes a user interface device (395) in communication with the controller data processing device (325). The user interface device (395) may include a video display operable to display text and/or graphic symbols or other visual indicators such as indicator lights or the like as well as a user input device such as keypad elements or the like responsive to user inputs. The user interface device (395) is operable to display various indicators related to operating parameters of the power manager including status, error codes, menus or the like and to respond to user input sections such as menu choices or the like.

7.2.1 Operating Mode:

A basic non-limiting exemplary operating mode of each of the power distribution and control modules (200) and (300) described above is as follows. The energy management schema maps the DC power network by polling each device port using a digital communication signal transmitted over a controller network interface device (246) (335) and associated controller communication channels (247), (248), (375). The polling query is directed to external power devices connected to device ports. If an external power device does not respond to the polling query, the device ports where no response is received are inactivated. Inactivation is accomplished by operating a controllable switching element, e.g. (240) in FIG. 2, or operating a controllable DC to DC power converter, e.g. the DC to DC power converters (241) associated with output devices shown in FIG. 2 or DC to DC power converters (360) associated with output devices in FIG. 3 as a controllable switch to disconnect the device port from the power bus (210) in FIG. 2, or to disconnect output device ports (310) of the power distribution network (315) in FIG. 3.

The polling query includes a request for information. The requested information includes one or more of: device ID, device type ID, operating voltage range, peak, average and idle mode operating power requirements, including input power for power sources or output power for power loads or standalone rechargeable batteries. Additional information may further be requested or provided including operating current ranges and other parameters that may be available. If a connected external power device is a smart rechargeable battery the polling query may request a battery capacity e.g. measured in watt-hours (Wh) or ampere-hours (Ahr), State of Charge (SoC), Time to Empty (TtE) or related metric indicative of what portion of the battery capacity is still usable or how much longer the battery can be used before its present charge capacity is used up. Additionally a smart rechargeable battery may provide charging information such as charging current amplitude ranges and temporal current amplitude profiles, or the like. If the requested information is provided, the energy management schema uses the requested information to map the DC power network to store the requested information in tables associated with the corresponding devices and establish operating parameters suitable to distribute the available input power to one or more power loads and or standalone rechargeable DC batteries connected to output ports. The polling query is repeated at a constant polling rate such as every 20 to 100 msec; however any polling rate that provides acceptable network performance is usable.

Some external power devices can be dumb devices, meaning they cannot respond to a polling query or they can respond to the polling query but only with limited information, such only with a device ID and device type ID, or with less than all the information needed by the energy management schema to configure the DC power network. To support dumb external power devices, the power distribution and control module (200) (300) is operable to store device type profiles on the controller memory module (230), (330) or controller data processing device (220) (325) and to look up a device type ID profile to determine power characteristics associated with a dumb device of a particular device type connected to the power distribution and control module (200) (300). Specifically the controller memory module (230), (330) store look up tables and or the like that contain power characteristic information for various DC power loads, DC power sources and rechargeable DC batteries that are compatible the power distribution and control module (200) (300).

Thus, when desired information is not provided or only limited power information is obtainable by communication with an external power device, the energy management schema operates to use what information is available to look up power characteristic information in look up tables stored on the controller memory module (230) (330) to determine if the connected device is operable on the DC power network and if so using what power parameters. If the connected power device cannot be identified, it is either never connected or if already connected; it is disconnected from the power bus or power distribution network.

The energy management schema is further operable to store historic data collected from external power devices connected to external device ports on the controller memory module (230), (330) and the historic data is retrieved as needed when the same or a similar external power device is connected to a device port. In other embodiments described below, dumb devices can be associated with smart wire cables and or smart adaptors configured to include data storage and data communication elements operable on the cables or smart adaptors to communicate with the controller data processor and controller memory devices operating on the power distribution and control modules (200) and (300).

8 EXTERNAL POWER DEVICE CONFIGURATIONS

Figure 4:
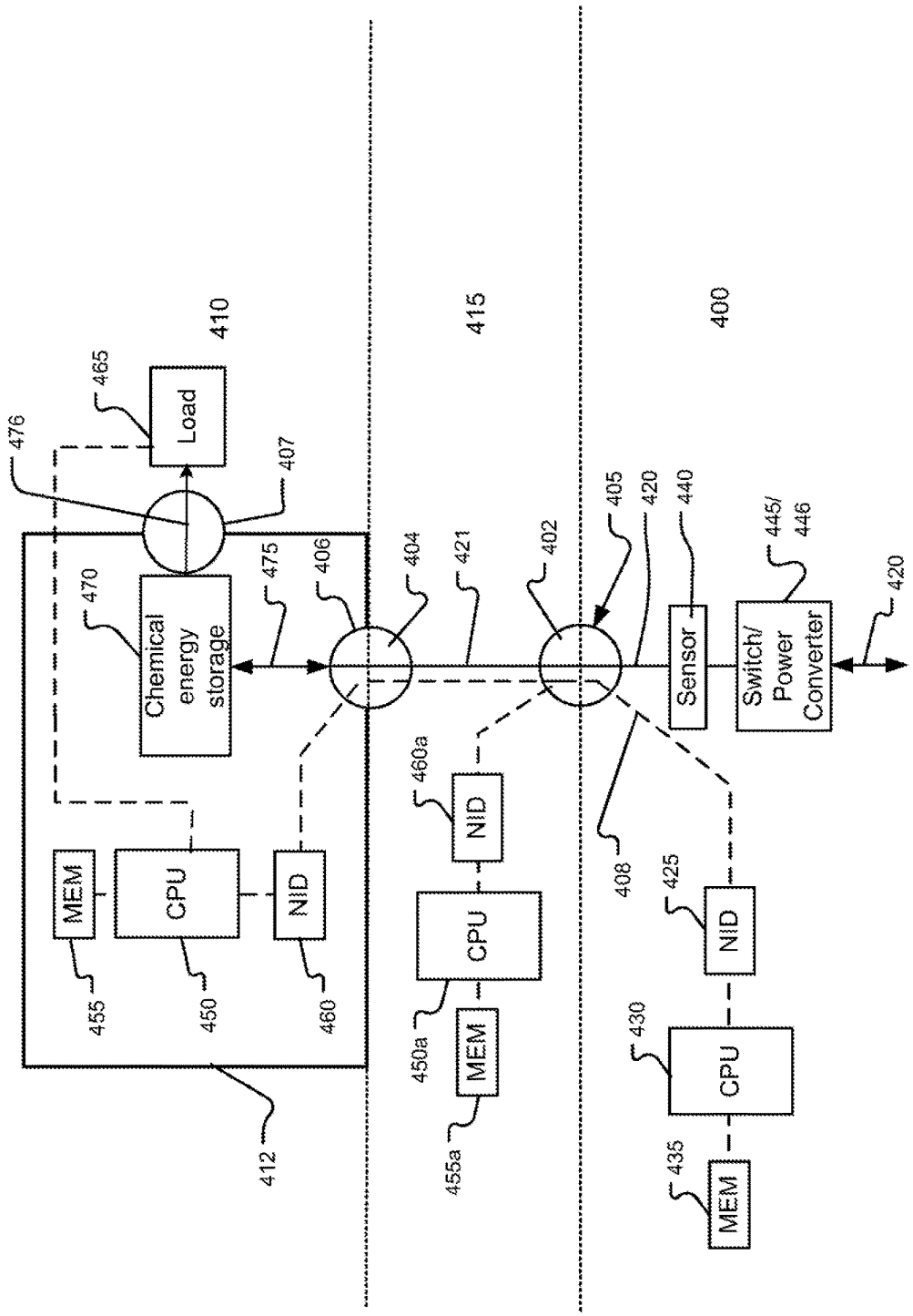
FIG. 4 depicts a non-limiting exemplary schematic diagram depicting elements of a smart DC power device electrically interfacing with a device port of a DC power distribution and control system according to the present invention.

Turning now to FIG. 4 a schematic diagram depicts power and communication elements associated with a device port (405) operating on a power distribution and control module (400) according to the present invention. The power distribution and control module (400) is either of the power and distribution and control modules (200) or (300) described above. An external power device (410) is electrically interfaced to the device port (405) over a smart wire cable or smart adaptor (415). The smart wire cable or smart adaptor (415) preferably includes electrical power connectors (402) and (404) formed at each of two opposing ends of a power conductor or power channel (421) such as a wire or other conductive element. The electrical power connector (402) interfaces with the device port (405) and the electrical connector (404) interfaces with the external power device (410), e.g. at an I/O port (406). A smart adaptor (415), that does not necessarily include a wire cable but instead may comprise a conductive trace mounted on a substrate, or the like, provides an alternate electrical interface to a wire connector wherein mechanical structure of the smart adaptor supports electrical power connectors (402) and (404) in a manner that provides the desired electrical interface between the external power device (410) and the device port (405). The smart wire cable or adaptor (415) may comprise a portion of either of the external power device (410) or the power distribution and control module (400) such as when the smart wire cable or adaptor (415) is partially or entirely formed by the enclosure of the power distribution and control module (400) or by an enclosure of the external power device (410), or the smart wire cable or adaptor (415) may comprise a standalone element. It is further noted that either end of the smart wire cable or smart adaptor (415) may be substantially permanently tethered to either one of the device port (405) or the I/O port (406) without deviating from the present invention.

A communication channel (408) extends from a controller network interface device (425) provided on the power distribution and control module (400), through the device port (405) and the communication channel (408) continues either to the external power device (410) through the I/O port (406), if the external power device is configured as a smart device, or may terminate in the smart wire cable or smart adaptor (415) if the smart wire cable or smart adaptor is configured as a smart device. In the case where the external power device (410) is configured as a smart device, a smart cable or smart adaptor is not required. However a dumb cable is used instead wherein the dumb cable comprises an electrical cable with electrical terminals or connectors provided on each end thereof.

A power sensor (440) in communication with a controller data processing device (430) is operable to sense instantaneous voltage and power or current amplitude passing over the device port (405). Preferably the power sensor (440) senses instantaneous voltage and power amplitude for bidirectional input power and output power. Ideally the power sensor (440) is operable to sense instantaneous voltage at the device port (405) and other parameters that allow the data processing device (430) to determine instantaneous power or current. In some operating modes, the power sensor (440) is usable to sense voltage and power amplitude being drawn by a dumb power load so that the load can be powered. Alternately the power sensor (440) is usable to sense voltage and power amplitude available from a dumb power source so that the source can be used to power other devices.

The power distribution and control module (400) includes a controllable switching element (445) disposed along a power channel (420). The controllable switching element is operable by the controller data processing device (430) to disconnect and reconnect the device port (405) from the power channel (420). As noted above, the controllable switching element (445) comprises either a controllable switch (445) or a DC to DC power converter (446) operable to modulate current amplitude, or both.

8.1 Smart External Power Device

The external power device (410) is depicted as a smart device that includes a smart rechargeable DC battery (412) and a DC power load (465) being powered by the smart rechargeable DC battery (412). The smart rechargeable DC battery (412) comprises chemical energy storage device (470), a battery digital data processor (450), a battery memory (455), in communication with the battery data processor (450), and a battery network interface device (460) in communication with the battery data processor (450). The smart battery further includes a first I/O port (406) for electrically interfacing with the power distribution and control module (400) and a second I/O port (407) for interfacing with the power load (465). An input power channel (475) extends between a battery I/O port (406) and the chemical energy storage device (470) and an output power channel (476) extending between the chemical energy storage device (470) and the DC power load (465). The skilled artisan will recognize that the power load (465) has two power terminals, e.g. positive and negative power terminals, with one power terminal, e.g. the positive power terminal, connected with the power bus or other positive power terminal associated of the power distribution and control module (400) and the negative power terminal connected with a negative or ground terminal of the power distribution and control module (400). Accordingly each leg of the power channel (476), (475), (420) comprises a wire pair with one wire connecting positive power terminals in series and the other wire connecting negative power terminals in series.

Other configurations are possible, e.g. the battery data processor (450) is optional, since in some cases the battery memory (455) can be read by the controller data processing device (430) without a battery data processor (450). Additionally the battery digital data processor (450), the battery memory (455), and the battery network interface device (460) may be combined on the same device such as the data processor. In any event, any smart device configured to exchange communication signals with the controller data processing device (430) is usable without deviating from the present invention. Moreover as noted above when the external power device is a smart device, the smart cable or adaptor (415) can be replaced by a dumb cable or adaptor that simply provides a power channel (421) and connectors (404) and (420) and a communication channel (408) operable to electrically interface with communication channel terminals at each of the device port (406) and the I/O port (405).

The DC power load (465) draws power from the chemical energy storage device (470). While the DC power load (465) may communicate with the battery digital processor (450) to track state of charge (SoC) time to empty (TtE), or the like, the DC power load (465) is not necessarily in communication with the power distribution and control module (400). Typically, the DC power load (465) and the smart rechargeable DC battery (412) are packaged together as a portable device that can be disconnected from device port (405) and operated independently of the DC power distribution and control module (400). In a typical scenario, the only communication between the smart external power device (410) and the DC power distribution and control module (400) is by the smart rechargeable DC battery (412) and then only when the smart rechargeable DC battery (412) is interfaced with a device port (405). As a result, the DC power distribution and control module (400) is often only aware of the State of Charge and charge storage capacity of the battery and has no access to information about the power load (465) such as its actual power consumption over time.

The external power device (410) may comprise a standalone smart rechargeable DC battery (412). This may be the case when a smart rechargeable DC battery (412) is removed from or otherwise separated from the DC power load (465) and only the smart rechargeable DC battery is connected to the device port (405) for recharging or to be used as a power source. Alternately a smart rechargeable DC battery (412) may operate like a standalone smart rechargeable battery even when connected to the DC power load (465), which may be the case when the power load is turned off or placed in an idle mode by a user.

In the case of the power distribution and control module (300) which is primarily configured to recharge smart batteries, the typical configuration is that all of the output device ports are each connected to a standalone smart battery and the control module is operated to recharge the connected smart batteries as standalone devices. Exemplary smart batteries usable with the present invention include but are not limited to military batteries e.g. models BB-390, BB-2001, BB-2590, BB-2600, BB-2800, BB-2847, PRC-148, PRC-152, PRC-153 and the Conformable Wearable Battery (CWB).

The device port (405) is operable as either an input or an output device port where the power distribution and control module configuration allows it. In an exemplary operating mode of the present invention, smart rechargeable DC batteries (412) that include a DC power load (465) are treated as power loads. Smart rechargeable DC batteries (412) that do not include a DC power load (465) or wherein the power load is turned off or in idle mode are treated as a standalone rechargeable battery. In one operating mode each standalone rechargeable battery connected to the power distribution and control module (200) or (300) is allocated charging power when sufficient input power is available. In one operating mode one or more standalone rechargeable batteries are used as an input power source when insufficient input power prevents powering high priority power loads connected to the power distribution and control module (400).

8.1.1 Power Exchanges with Smart Devices

While a smart rechargeable DC battery (412) is connected to a device port (405) the battery digital data processor (450) and the controller data processing device (430) operating on power distribution and control module (400) are in communication over the communication channel (408) through the controller network interface device (425) and battery network interface device (460). In cases where a smart rechargeable DC battery (412) is connected to a device port (405) the smart cable or adaptor element (415) is not required and simple cable connector with electrical connectors at each end is used. In response to queries from the controller data processing device (430) the battery digital data processor (450) reports data such as a device ID, a device type, an operating voltage range, current amplitude limits, peak and average power requirements, battery capacity e.g. measured in watt-hours (Wh) or ampere-hours (Ahr), SoC or TtE, or related metric indicative of what portion of the battery capacity is still usable or how much longer the battery can be used before its present charge capacity is used up, charging information such as fully charged voltage, fully discharged voltage, or the like. Alternately when only a device type is reported, the remaining information may be pulled from look-up tables, or the like, stored on the controller memory (435) or data processing device (430). The power requirements reported by the smart battery associated with a power load may be associated only with the DC power load (465) only with the DC battery, or both; however, when no load is present or the load is not operating the power requirements only relate to the smart rechargeable DC battery (412).

Once the device type and power characteristics of the external power device (410) are known, the energy management schema operates to determine if a voltage conversion is needed and if so, whether a DC to DC power converter (446) is available and can be configured for the required voltage conversion. If a suitable power configuration is available, the DC to DC power converter (446) is configured for the desired voltage conversion. Additionally the DC to DC power converter (446) is optionally configured to provide current amplitude and or power amplitude limits. Once configured the energy management schema further configures the power distribution and control module (400) to power external power device (410) using input power available from a connected power source or sources. Thereafter the energy management schema periodically queries the external power device (410) to determine if the device (410) is still connected to the device port and to refresh power characteristic data e.g. SoC.

8.1.2 Smart Cable Adaptor

In some situations it is desirable to connect a dumb DC power load (465) or dumb battery to the device port (405). In such cases a smart wire cable or smart adaptor (415) is disposed between the dumb device, e.g. the DC power load (465), and the device port (405) and the smart wire cable or smart adaptor (415) is configured to store and exchange digital data with the controller data processing device (430) over the communication channel (408). The smart wire cable or smart adaptor (415) is configured with a cable data processing device (450a), a cable memory module (455a) in communication with the cable data processing device (450a) and a cable network interface device (460a) interfaced to the communication channel (408). The smart wire cable or smart adaptor (415) is configured to store power characteristics of the associated DC power load (465) on the cable memory module (455a) and or cable data processing device (450a) which are operable to respond to queries from the controller data processing device (430) and to provide some or all of the stored data to the controller data processing device (430). At a minimum, a device ID and device type are stored on the smart wire cable or smart adaptor (415); however, other power characteristics such as operating voltage range, peak and average power consumption, and current limits can also be stored on the smart wire cable or smart adaptor (415). Once power characteristics stored on the smart wire cable or smart adaptor (415) are read by the controller data processing device (430) the energy management schema is operable to look up additional power characteristics corresponding to the device type and then configure the power network to add the dumb DC power load (465) to a DC power network as described above.

In another example configuration a rechargeable dumb battery or a plurality of rechargeable dumb batteries is associated with a smart wire cable or smart adaptor (415) and connected to the device port (405). In this case the smart wire cable or smart adaptor (415) is configured to include power information associated with the dumb rechargeable battery or batteries stored thereon in a format readable by the controller data processing device (430). Once included in the DC power network established by the energy management schema the rechargeable dumb batteries may be recharged by a battery management module operating on the energy management schema or may be treated as a DC power supply usable to deliver input power to the DC power network to power loads connected to the power distribution and control module (400).

Other smart cable/adaptor configurations are possible, e.g. the cable data processing device (450a) is optional, since the cable memory module (455a) can be read by the controller data processing device (430) without a cable data processor (450a). Additionally the cable data processing device (450a), the cable memory module (455a), and the cable network interface device (460a) may be combined on the same device. In any event, any smart cable or smart adaptor configured to exchange communication signals with the controller data processing device (430) is usable without deviating from the present invention.

In other situations where it may be desirable to connect the DC power load (465) directly to the device port (405) without the smart rechargeable DC battery (412) and without a smart cable or adaptor or when the smart cable or adaptor does not have the power characteristics of the connected DC power load (465) a sensor signal output from the power sensor (440) may be usable to determine power characteristics of the connected DC power load (465). For example, an operating voltage and instantaneous power draw may be sensed by the power sensor (440) when a test current is delivered to the connected dumb DC power load (465) in order to determine its power characteristics. In particular a resistor of known resistance, or the like, associated with the power sensor (440) may be used to determine a voltage and or current amplitude of an incoming or outgoing power signal passing over the resistor.

8.2 Allocating Power to DC Power Loads

Referring to FIGS. 1-5 a DC power load (465) is any electrical device that consumes DC electrical power to perform a task. Conversely, while a standalone rechargeable DC battery receives DC power during recharging, substantially all of the DC power received by the standalone rechargeable DC battery is stored thereby and is potentially retrievable excluding losses due to power conversions and other inefficiencies. Moreover the energy stored by standalone rechargeable DC batteries is retrievable by the power distribution and control networks described herein. In the first non-limiting example embodiment of FIG. 2, a soldier power manager (110) and DC power loads (130, 140, 150, 160) are electronic devices carried by an infantry soldier and most if not all of the DC power loads include a smart rechargeable DC battery (412) or other rechargeable battery associated with a smart wire cable or smart adaptor (415), shown in FIG. 4.

Thus typical external DC power loads operable with the present invention include a DC power load and an associated rechargeable DC battery or other energy storage device connected by a smart cable. The DC power loads vary with respect to power consumption or power allocation needs, with some DC power loads having a substantially constant power allocation requirement, e.g. a lamp, a fan or pump operating at constant speed, while other DC power loads have time varying power demands as may be the case for a communication device which demands a peak DC power load to transmit and a lower DC power load to listen. Similarly, different rechargeable DC battery types may draw different power loads and have different operating voltage ranges during charging depending on battery chemistry, cell configuration, energy storage capacity (e.g. measured in watt-hours (Wh) or ampere-hours (Ahr)), charging rates, and the like, and these factors are taken into account by the energy management schema when allocating charging power according to the present invention.

Figure 5:
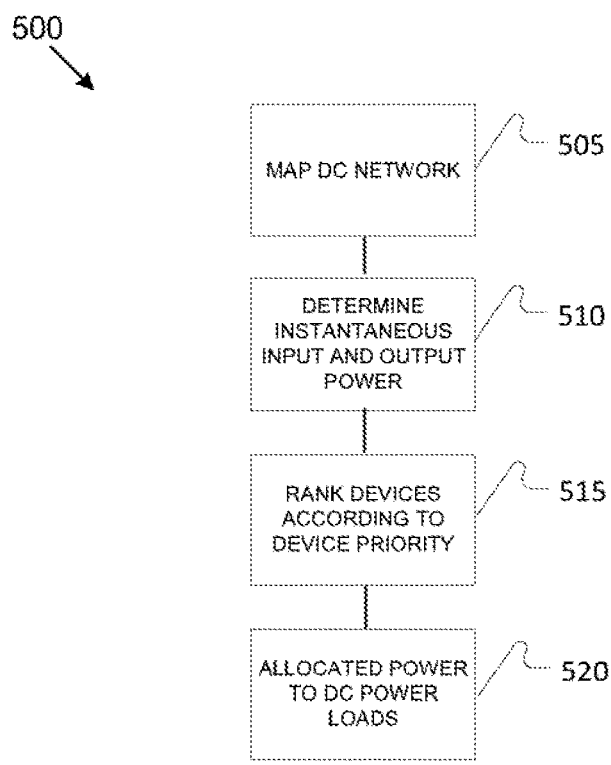
FIG. 5 depicts a non-limiting exemplary flow diagram depicting power allocation steps performed by an energy management schema program operating on a controller data processing device of a DC power distribution and control system according to the present invention.

Referring to FIG. 5, a flow diagram (500) provides an exemplary power allocation process carried out by the energy management schema of the present invention while operating on the controller data processing device (220) or (325) described above. In step (505) the energy management schema maps the power distribution and control module (200), (300) by polling each device port to identify each external power device connected thereto. The energy management schema groups connected external power devices by device type according to DC power sources, DC power loads, and standalone rechargeable DC batteries. Other device types such as non-rechargeable batteries may be grouped separately or designated DC power sources. Additionally the energy management schema maps each system or internal power loads (285) and (385), operable to power the power distribution and control module (200), (300) and the system or internal power loads are included in the total instantaneous power demand associated with the mapped power distribution and control module.

In step (510) the energy management schema determines the total instantaneous input power available from all the DC power sources connected to the power distribution and control module and the total instantaneous power demand associated with all the DC power loads, including system of internal power loads. Generally the energy management schema does not include standalone smart rechargeable DC batteries in the total instantaneous power load, instead only including DC power loads. In the case of the power distribution and control module (300), which has only one input port, the only DC power source available is connected to the input device port (305).

The total instantaneous input power may be determined based on instantaneous input power sensor signals or may be based on power characteristics read from smart DC power supplies or read from smart cables/adaptors associated with DC power supplies, or both. The total instantaneous power demand may be determined based on instantaneous output power sensor signals or may be based on power characteristics read from smart DC power loads and or read from smart cables/adaptors associated with DC power loads, or both. In a default operating mode, the energy management schema bases total instantaneous power demand on the peak power demand of each DC power load. More specifically, when the peak power demand of each DC power load is known, each DC power load is allocated a power allotment equal to its rated or expected peak power demand.

In step (515) the energy management schema ranks each DC power source according to its source priority and ranks each DC power load according to its load priority. In one non-limiting exemplary embodiment a high power source priority is assigned to substantially unlimited DC power sources that are able to deliver substantially constant input power amplitude at substantially constant voltage as is the case with a DC power converter connected to an AC power grid, or the like. A high source priority may also be assigned to an electrochemical power generator such as a fuel cell or an electromechanical power generator such as an electrical power generator driven by a fossil fuel engine, or the like, because the input power generated by these devices is substantially non-time varying and the input voltage remains substantially constant. A lower source priority is assigned to time-varying power amplitude and or time-varying voltage power sources such as a photovoltaic or wind powered energy source which generally delivers time-varying input power amplitude at a time-varying input voltage due to temporal variations in wind and sunlight conditions. An even lower source priority is assigned to DC energy storage devices, such as rechargeable or non-rechargeable DC batteries connected to the power distribution and control module (200), (300), which can be used when no other external power sources are available but which are preferably not used except to power high priority power loads.

In the case of the power distribution and control module (300) described above, only one DC power source (340) is connected to the input port (305) so a source priority is not relevant to selection which DC power source is used to power loads. However, even when only one DC power source is connected to either of the power distribution and control modules (200), (300), the source priority of the input power source may be used by the energy management schema in determining how the total available input power is distributed to power loads.

In the case of the power distribution and control module (200) two or more DC power sources, e.g. connected to ports (3), (4) or (5), may be available to the power bus (210) so in the embodiment of FIG. 2 the energy management schema is operable to connect a single DC power source, e.g. the highest source priority DC power source, to the power bus (210) and to base the total instantaneous input power on only one power source while disconnecting other power sources from the power bus to hold in reserve. However, if the total instantaneous input power from one power source does not meet the total instantaneous power demand, the energy management schema is operable to connect a plurality of input power sources to the power bus (210) in order to meet the total instantaneous power demand.

In step (520) the energy management schema allocates the total instantaneous input power to DC power loads connected to the power distribution and control module and to system or internal power loads. In a default operating mode, the energy management schema allocates the total available instantaneous input power to the highest priority power loads first and then to lower priority power loads until either all of the connected DC power loads are powered with enough power to meet the peak power demand of each DC power load, or until all of the total available input power is allocated. The energy management schema uses the following power allocation policies or guidelines. Each DC power load is allocated its peak power demand, if known, whether or not the power load is drawing peak power at the time. A DC power load will not be allocated power unless its peak power demand can be allocated. In some operating mode embodiments, external DC power loads that are not allocated power may be disconnected from the power distribution and control module e.g. by actuating a switch (240) or attenuating current amplitude using a DC to DC power converter, (241) as described above. A third guideline is that standalone rechargeable batteries are not allocated charging power during the initial power allocation step (520).

8.3 Battery Charging Manager

The energy management schema of the present invention further includes a battery charging manager module operating thereon or operating separately on the controller data processing device (220) and (325). Since most rechargeable batteries can be recharged using low current amplitude, e.g. trickle charging, the battery manager module of the present invention is operable to allocate low power amplitude signals to rechargeable DC batteries connected to the DC power networks. In contrast to DC power loads, wherein the energy management schema either allocates peak power to each DC power load or allocates no power to the DC power load, the battery charging manager module is operable to allocate low amplitude power signals to rechargeable batteries to increase their state of charge using whatever unallocated input power is remaining after the available instantaneous input power has been allocated to power loads. More specifically, the battery manager module allocates Total Charging Power (TCP) to one or more rechargeable DC batteries operably connected to the power distribution and control module, wherein the TCP is equal to the difference between the total instantaneous input power available and the total DC power allocated to power loads by step (520). In addition as will be further described below, the controller data processing device (220) and (325) optionally includes a Peak Power Tracking (PPT) module (397) operable thereon to actively maximize input power amplitude. The PPT module (397) is preferably operated when the input power signal is widely variable such as when the input power is generated by a wind, solar, water driven or other power generating source that varies according to changes in local conditions or operating modes. Operation of the PPT module (397) can be user selected or automated.

In a first non-limiting exemplary operating mode the battery manager module allocates a portion of the TCP to each rechargeable DC battery connected to the power distribution and control module. In a second non-limiting operating mode the battery manager module allocates the TCP to selected rechargeable DC batteries connected to the power distribution and control module. In either operating mode the battery manager module is operable to allocate equal portions of the TCP to each rechargeable DC battery connected to the power distribution and control module or to allocate unequal portions of the TCP to all or selected rechargeable DC batteries connected to the power distribution and control module. More generally, the battery manager module allocates the TCP to recharge smart rechargeable DC batteries connected to the power distribution in a manner that manages the Average State of Charge (ASoC) of a group of rechargeable DC batteries connected to the power distribution and control module, where the group of rechargeable DC batteries may include all rechargeable DC batteries, only standalone rechargeable DC batteries, or another group as may be defined by policies operating on the battery charging manager.

As described above, the energy management schema determines the total instantaneous input power available and then allocates the total instantaneous input power to DC power loads connected to the power distribution and control module. In cases where the total instantaneous input power available exceeds the total instantaneous power load, the battery charging manager operates to allocate the TCP to one or more rechargeable DC batteries. In cases where the total instantaneous input power available fails to meet the total instantaneous power load, the battery charging manager operates to allocate a portion of the total instantaneous input power available to the highest priority power loads in peak power allotments to as many power loads as can be powered at peak power. In cases where unallocated instantaneous input is remaining, i.e. when TCP is non-zero, the battery charging manager operates to allocate the TCP to one or more rechargeable DC batteries connected to the power distribution and control module.

Figure 6:
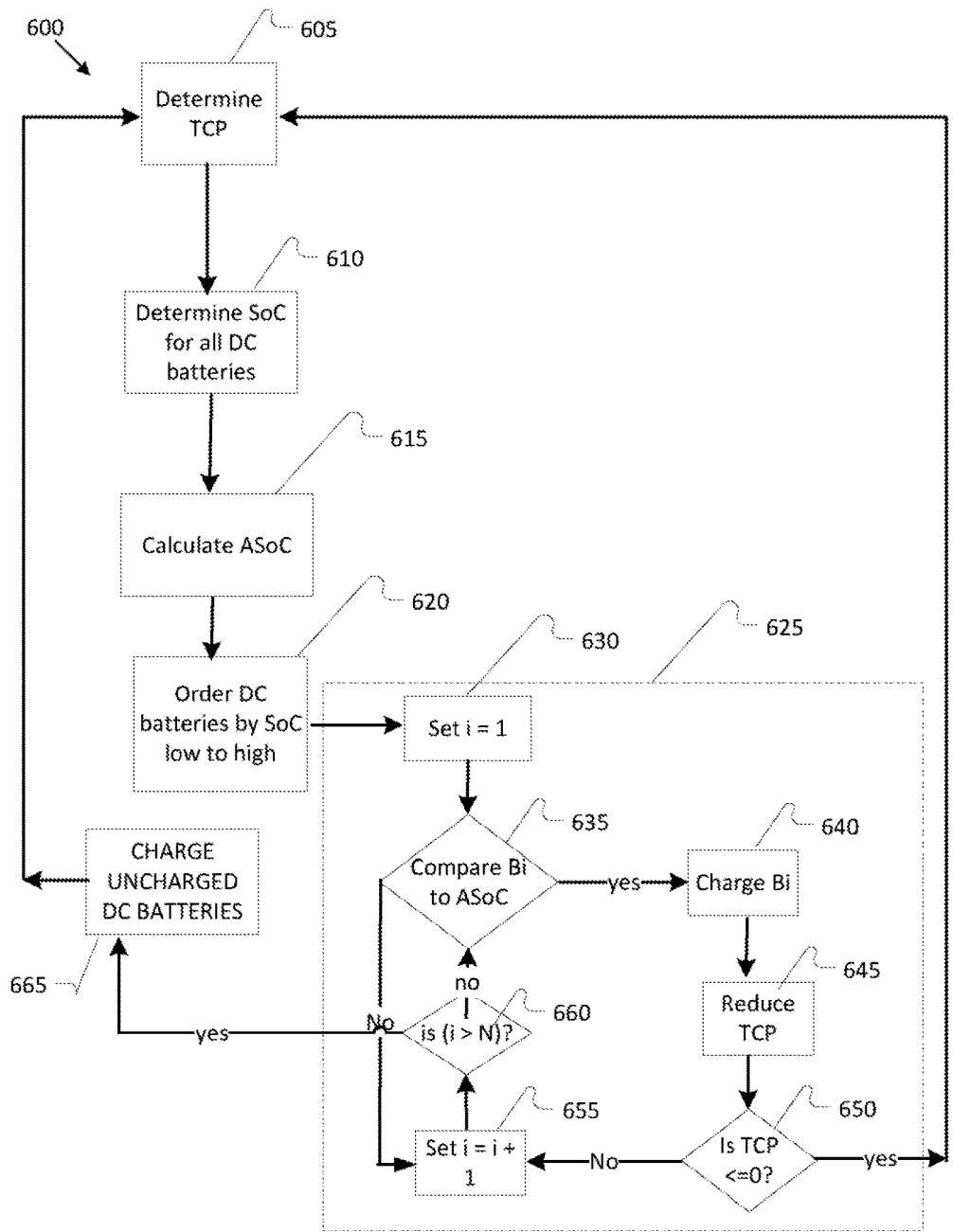
FIG. 6 depicts a non-limiting exemplary flow diagram depicting power allocation steps performed by a battery charging manager program operating on a controller data processing device of a DC power distribution and control system according to the present invention.

Referring now to FIG. 6, a schematic flow diagram (600) details operating steps carried out by the battery charging manager program or schema operating on the controller data processors described above according to the present invention. As detailed above the battery charging manager may comprise a program module of the energy management schema or may comprise a separate program module operating on the controller data processor.

In a step (605) the energy management schema determines the Total Charging Power (TCP) which is determined by subtracting the total instantaneous power allocated to power loads from the total available instantaneous input power. More specifically, the TCP is equal to unallocated instantaneous input power after the total available input power has been allocated to power loads by the energy management schema.

In step (610) the battery charging manager determines the instantaneous SoC of a group of rechargeable DC batteries connected to the DC power network. The group may comprise all the rechargeable DC batteries, including those associated with power loads, or the group may include only standalone rechargeable DC batteries or combinations of both depending on policies operating on the battery charging manager. The instantaneous SoC information is refreshed each time the energy management schema maps the power distribution and control module in step (505), described above, and the SoC values are stored on the controller memory module (230) or (330) e.g. in tables associated with connected external DC power devices, or the like.

The SoC may be read from smart rechargeable DC batteries or may be inferred from power sensor signals e.g. by estimating the SoC based on the instantaneous operating voltage of the rechargeable DC battery as compared to characteristics of the battery type such as the fully charged and fully discharged voltages. In one example wherein a particular battery type has a fully charged voltage of 12.2 volts and a fully discharged voltage of 9.8 volts, an instantaneous battery voltage of 11 volts suggests that battery SoC is 50%.

In addition to or alternate to determining the SoC, a Time to Empty (TtE) value may be read from a smart DC battery or may otherwise be inferred from data stored by the energy management schema. In one example the TtE represents the remaining operating time of the rechargeable DC battery given its current state of charge, its charge capacity and its expected rate of power draw and or its expected rate of charging. In a simple non-limiting operating example the charge manager makes a TtE estimate based on the present SoC of the DC battery, the charge capacity of the battery and an assumption that the battery not be recharged and will be continuously discharged at its maximum discharge rate.

In step (615) the battery charging manager calculates an average state of charge (ASoC) associated with a group of rechargeable DC batteries being managed. The ASoC is determined by summing the SoC value each rechargeable DC battery in the group and dividing the sum by the total number of batteries in the group. In various operating modes the battery group of rechargeable DC batteries being managed includes only standalone rechargeable DC batteries, all rechargeable DC batteries connected to the power distribution and control module, including those associated with power loads, only batteries or a particular type, e.g. only 12 volt batteries, or various combinations thereof. Selection of the battery group is dependent on various criteria including the load and source priority of various external devices connected to the power distribution and control module, on polices operating on the battery charging manager and or energy management schema, on user defined operating modes, or the like. In step (620) the SoC value of each battery in the group of batteries being managed is sorted into SoC order such as $B_1$ $B_2$, BN where $B_1$ is the battery with the lowest SoC and $B_N$ is the battery with the highest state of charge. Other sort criteria are usable without deviating from the present invention.

The battery charging manager then executes an allocation loop (625) which operates to manage the battery group ($B_1$, $B_2$ ... $B_n$) by allocating portions of the TCP to one or more of the rechargeable DC batteries in the battery group. The TCP is allocated according to allocation criteria which may be set by default, may depend on instantaneous operating conductions and or historic operating conditions, may be user selectable, or may be set by policies of the energy management schema or of the battery charging manager. Additionally the allocation criteria may depend on device priorities, battery type, and other data read from connected smart devices or otherwise available to the energy management schema or the battery charging module.

In one non-limiting operating example, the allocation criteria charges only batteries in the group of batteries being managed that have a SoC value that are less than the ASoC. In another non-limiting operating example the allocation criteria considers the charge capacity of each rechargeable DC battery in the group and weights TCP charge allotments according to battery charge capacity by allocating larger charge allotments to batteries that have a larger charge capacity than is allotted to batteries that have a smaller charge capacity. For example if the battery group includes two rechargeable DC batteries each having the same SoC but having different battery charge capacities, the larger capacity battery is allocated more of the TCP than the smaller capacity battery and the allotments are made in a manner that tends to increase the SoC of each battery by an equal amount.

More generally the allocation criteria allocate unequal portions of the TCP to some or all of the batteries in the group of rechargeable DC batteries being managed. In a preferred embodiment, the allocation criteria allocate larger portions of the TCP to those batteries in the group of batteries being managed that have an instantaneous SoC value that is less that the ASoC of the group of batteries being managed. In a preferred embodiment the allocation criteria allocate portions of the TCP in a manner that tends to bring all of the rechargeable DC batteries in the group of batteries being managed to the same ASoC value and thereafter to allocate portions of the TCP in a manner that tends to maintain each battery in the group at a substantially equal SoC. In a preferred embodiment the allocation criteria includes a weighting algorithm which weights TCP allocations to compensate for differences in the charge capacity of the batteries in the group of batteries being managed. In particular the weighting factor is selected to allocate power in a manner that causes incremental increases in the SoC to be substantially the same for each rechargeable DC battery in the group irrespective of the charge capacity of each battery.

An exemplary non-limiting allocation Loop (625) sets a counter value (i) equal to 1 in step (630) where a different value of (i) is used to identify each of the rechargeable DC batteries in the group of batteries being managed. In step (635) the SoC value of a battery $B_i$ is compared to the ASoC of the group of batteries being managed. If the SoC value of a battery $B_i$ is less than ASoC, the loop jumps to step (640) to allocate a portion of the TCP to the battery $B_i$. If the SoC value of a battery $B_i$ is greater than ASoC, the loop jumps to step (655), described below.

Since the batteries are already sorted in SoC order in step (620), the first battery $B_1$ has the lowest state of charge. Nevertheless, the step (635) first checks to determine if the SoC of the battery $B_1$ is less than the ASoC and if so allocates a portion of the TCP to charge the battery $B_i$ in step (640).

As described above the allocated portion of the TCP may depend on the charge capacity of the battery $B_i$ and other factors. Additionally in one non-limiting example operating mode the allocated portion of the TCP is further weighted with respect to the magnitude of the difference between the SoC of the battery $B_i$ and the ASoC. In one non-limiting example embodiment the step (640) weights TCP allocations in a manner that allocates a larger portion of the TCP to batteries having small instantaneous SoC values than to batteries having larger instantaneous SoC values. Additionally the step (640) may weight TCP allocations differently depending on other factors such as the source priority, on whether the group of batteries being managed includes smart DC batteries associated with power loads, which already received a peak power allocation in prior step (520) and other present and historic power allocations.

Thus the allocation loop (625) operates in a manner that causes step (640) to only allocate portions of the TCP to batteries $B_N$ that have an instantaneous SoC that is less than the ASoC of the group being managed. Otherwise the step (635) causes the loop to jump to step (655) which is described below.

In step (645) the TCP is reduced by an amount equal to the portion of the TCP that was allocated to the battery $B_i$ in the prior step (640). In step (650) the TCP is compared to zero and if the remaining unallocated TCP is equal to zero the loop (625) is stopped by jumping to step (605) until the next time network is mapped, e.g. once every 20 to 100 msec. If the TCP is non-zero, the loop jumps to step (655) where the counter is incremented to i+1 and the loop jumps to step (660) where the value of (i) is compared to N wherein N is equal to the number of batteries in the group being managed. If (i) is less than or equal to N the loops jumps to step (635) to process the next battery $B_i$. In this manner the loop continues until (i>N) or until the remaining unallocated TCP is equal to zero as determined in step (650) which causes the loop to jump to step (605) to wait for the next time the network is mapped.

In step (635) each time the SoC of a battery $B_i$ is greater than the ASoC, the loop jumps to step (655) which increments (i) without allocating a portion of the TCP to the battery $B_i$. In step (655) the (i) value is incremented and the loop jumps to step (660) to compare the (i) value to (N) and then if (i≥N) the loop jumps back to step (635) to process the next battery $B_i$. In cases where the SoC value of Bi is greater than ASoC the loop continues to increment the (i) value in steps (665) without going to step (640) until (i>N) as determined in step (660). Thereafter the loop jumps to step (665) which can only happen when there is an unallocated portion of the TCP as determined in step (645) is non-zero.

In step (665) the unallocated portion of the TCP is allocated to the remaining batteries in the group being managed in equal portions. In particular each battery in the group being managed that was not allocated a portion of the TCP by the allocation loop (625) is allocation an equal portion of the unallocated TCP and the battery charging manager process jumps to step (605) to wait for the next time the power distribution and control module is remapped.

According to the present invention the specific portion of TCP allocated to a battery B; in step (640) can be varied by policies and other control elements of the energy management schema or the battery charging manager and may dependent on a number of factors including, for example, battery chemistry, battery type, battery SoC, ASoC of the group of batteries being managed, the source priority of the available power sources, the magnitude of the TCP, whether the battery $B_i$ is a standalone rechargeable DC battery or is connected to a DC power load and other factors including the ASoC of the group of batteries being managed and the number and type of DC power loads connected to power distribution and control module.

For example in cases where the TCP is large compared to the power allocated to DC power loads in step (520) the allocation criteria used in step (640) can be altered to take advantage of the excess charging power. In one example where the TCP is large compared to the power allocated to DC power loads in step (520) the group of batteries being managed is altered to include rechargeable DC batteries associated with power loads or to disassociate rechargeable DC batteries associated with power loads from the group of batteries being managed. In another example where the TCP is large compared to the power allocated to DC power loads in step (520) the allocation criteria is altered to a mode that attempts to more rapidly charge all of the batteries in the group of batteries being managed such as by allocating the entire TCP to the lowest SoC battery in the group or by allocating the entire TCP to the battery having the largest change capacity in the group, or the like.

Each of the steps set forth in FIGS. 5 and 6 are periodically repeated at fixed or variable temporal frequencies. In a non-limiting embodiment the power allocation steps of FIG. 5 are repeated every 20 to 100 milliseconds but other repeat intervals are usable. In a non-limiting embodiment a new cycle of the steps set forth in FIGS. 5 and 6 is initiated whenever certain changes in the power distribution and control module are detected, e.g. whenever an external power device is added or removed from the power distribution and control module, whenever a drop in input power amplitude or in bus power amplitude is detected, whenever input voltage or bus voltage falls below a threshold value, or the like.

In a non-limiting operating mode the controller data processing devices (220) (325) are operable to track power sensors associated with each device port to track voltage current and power amplitude and to record historic values for each external power device connected to the power distribution and control module. Thus in addition to data read from external power devices such as peak and average or idle power consumption values and or current amplitude limits, or the like, the controller data processing devices are also operable to track actual power consumption peaks, power consumption rates, and other parameters that are usable to estimate present SoC and or TtE values and or predict future SoC and or TtE values based on historic use data as well as power sensor values and values read from connected devices.

Additionally by tracking historic values for each external power device connected to the power distribution and control module and cataloging those values by device type, device ID, peak and average power consumption and the like, the energy management schema is operable to characterize specific devices and or device types to improve estimates of instantaneous input and output power conductions to improve power distribution management.

8.4 Peak Power Point Tracking

Referring to the power point tracking module (397) described above the PPT module (397) may comprise a separate operating mode that is initiated either automatically or by user selection. This operating mode is especially desirable whenever the input power source is found to have a large input power amplitude variability as may be the case with a photovoltaic solar blanket, wind turbine or vehicle power generation system. Moreover, operation of the PPT module (397) is better suited to charging batteries than to fully powering loads.

The PPT module (397) includes a peak power tracking algorithm stored and operable on the control module (325). The PPT module (397) uses a perturb and observe (P&O) PPT algorithm to track the input power amplitude as a function of an output current set point of one of the controllable power converters (360). To find an output current set point that results in peak input power the (P&O) algorithm monitors the input power sensor (350) while incrementally varying the output current amplitude of at least one DC to DC power converter (360). Thus a selected DC to DC power converter (360) is operated to incrementally modulate current amplitude through a range while monitoring input power at the input power sensor (350) with all the other DC to DC power converters set for zero current through put. After tracking power through the selected current range a peak power operating point is selected and the selected DC to DC power converter is set to a current amplitude operating point corresponding with the peak input power level. If the input power source delivers substantially non-varying or narrowly varying input power signal amplitude, all of the DC to DC power converters may be set to the same current set point associated with maximizing input current amplitude. If the input power signal amplitude is temporally variable the (P&O) algorithm may be repeated at the refresh rate e.g. using the same DC to DC power converted each time or the (P&O) algorithm may be repeated for each DC to DC power converter. In either case the DC to DC power converter current amplitude operating point may be refreshed at the refresh rate, such as every 20 to 100 msec.

As will be recognized by those skilled in the art, the present invention allocates peak power demand to each power load being power in step (520). However not every power load being allocated peak power uses the full power allocated. In cases where the power load is associated with a smart rechargeable DC battery as described above, a portion of the peak power allocation is stored by the smart rechargeable DC battery. More specifically any of the peak power allocated to a power load that is not used to power the load merely recharges the rechargeable DC battery associated with the power load thereby increasing its SoC. Thus whenever a DC power load fails to use its peak power demand for an extended period the rechargeable DC battery associated with the power load tends to become fully charged. For this reason, the energy management schema may be further configured to weight the allocation of DC power to power loads in step (520) according the SoC of rechargeable DC battery associated with the power load. In one non-limiting example step (520) may include allocating less than the peak power demand or in some cases not allocating any power to a DC power load when the SoC of rechargeable DC battery associated with the power load is nearly 100% or significantly higher than the ASoC of other rechargeable DC batteries connected to the power distribution and control module.

In a further operating mode example of the power distribution and control module (200), when the only available input power source is one or more rechargeable DC batteries connected to or connectable to the power bus (210), the energy management schema is operable to connect one or more rechargeable DC batteries to the power bus to power loads. As a first choice only a single standalone rechargeable DC battery is selected as an input source. In other operating modes power may be drawn from other rechargeable DC batteries connected to or connectable to the power bus (210) including DC batteries associated with low priority power loads.

In one operating mode the available standalone rechargeable DC batteries that are usable as input sources are sorted in SoC order and the standalone rechargeable DC battery having the highest SoC is exclusively connected to the power bus to power loads and exclusively used until it is fully discharged or until a more suitable input power source becomes available. If the first battery becomes fully discharged then the rechargeable DC battery having the next highest SoC is used exclusively until it is fully discharged and so on until all the available standalone rechargeable DC batteries are discharged. Thereafter rechargeable DC batteries associated with low priority power loads are used to power higher priority power loads as needed.

Alternately the energy management schema may monitor the SoC of all the standalone rechargeable DC batteries usable as an input power source and alternate which of the available standalone rechargeable DC batteries is used to power loads in a manner that essentially manages the SoC of all the available standalone rechargeable DC batteries usable as input power sources in a manner that attempts to keep the SoC of all the standalone rechargeable batteries equal.

It will also be recognized by those skilled in the art that, while the present invention has been described above in terms of preferred embodiments, it is not limited thereto. Various features and aspects of the above described invention may be used individually or jointly. Further, although the invention has been described in the context of its implementation in a particular environment, and for particular applications, e.g. as a soldier power manager or a portable battery charger, those skilled in the art will recognize that its usefulness is not limited thereto and that the present invention can be beneficially utilized in any number of environments and implementations where it is desirable to monitor and manage power resources in a manner that simultaneously powers loads and recharges batteries. Accordingly, the claims set forth below should be construed in view of the full breadth and spirit of the invention as disclosed herein.

What is claimed:

1. A method for allocating electrical power to a plurality of external power devices connected to a plurality of device ports of a power distribution and control module comprising the steps of:
    operating a controller data processor to poll each of the plurality of device ports;
    operating the controller data processor to determine an instantaneous configuration of the power distribution and control module that includes determining a device type for each of the plurality of external power devices connected to one of the plurality of device ports wherein the instantaneous configuration includes at least one DC power source and a plurality of rechargeable DC batteries;
    determining, by an energy management schema on the controller data processor, a total instantaneous input power available from the at least one DC power source; and
    allocating, by the energy management schema on the controller data processor, a portion of the total instantaneous input power to each of the plurality of rechargeable DC batteries according to allocation criteria.

2. The method of claim 1 further comprising the step of determining an instantaneous State of Charge (SoC) for each of the plurality of rechargeable DC batteries.

3. The method of claim 2 further comprising determining an Average State of Charge (ASoC) of all of the rechargeable DC batteries based on the instantaneous State of Charge (SoC) thereof.

4. The method of claim 3 wherein the allocation criteria are configured to allocate the portion of the total instantaneous input power to each of the plurality of rechargeable DC batteries in a manner that tends to equalize the SoC of each of the plurality of rechargeable DC batteries.

5. The method of claim 3 wherein the allocation criteria are configured to allocate the portion of the total instantaneous input power to at least a portion of the plurality of rechargeable DC batteries in unequal portions.

6. The method of claim 4 wherein the allocation criteria are configured to allocate a higher percentage of the total instantaneous input power to rechargeable DC batteries having an instantaneous SoC that is less than the ASoC.

7. The method of claim 4 wherein the allocation criteria are configured to allocate the total instantaneous input power to one or more of the plurality of rechargeable DC batteries that have an instantaneous SoC that is less than the ASoC.

8. The method of claim 3 wherein the allocation criteria are configured to:
    allocate more than 50% to the total instantaneous input power to rechargeable DC batteries having an instantaneous SoC that is less than the ASoC; and to,
    allocate the remaining unallocated portion of the total instantaneous input power to each of the rechargeable DC batteries that have an instantaneous SoC that is equal to or greater than the ASoC.

9. The method of claim 3 wherein the plurality of rechargeable DC batteries have a plurality of different charge capacity values further comprising the step of weighting the allocation criteria according to a charge capacity value of each of the plurality of rechargeable DC batteries.

10. The method of claim 1 wherein the instantaneous configuration further comprises one or more DC power loads attached to one or more of the plurality of device ports further comprising steps of;
    determining a total instantaneous power demand associated with the one or more DC power loads,
    allocating at least a portion of the total instantaneous input power to the one or more DC power loads;
    determining a Total Charging Power (TCP) equal to an unallocated portion of the total instantaneous input power;
    determining an instantaneous State of Charge (SoC), an operating voltage range and a charge capacity for each of the plurality of rechargeable DC batteries;
    determining an Average State of Charge (ASoC) of the plurality of rechargeable DC batteries;
    allocating the TCP to one or more of the plurality of rechargeable DC batteries according to the allocation criteria.

11. The method of claim 10 wherein the allocation criteria are configured to allocate a higher percentage of the TCP to rechargeable DC batteries having an instantaneous SoC that is less than the ASoC.

12. The method of claim 11 further comprising the step of weighting the allocation criteria according to a charge capacity value of each of the plurality of rechargeable DC batteries.

13. A power distribution and control module comprising:
    a controller data processing device, a controller memory module in communication with the controller data processing device and a controller network interface device in communication with the controller data processing device;
    at least one input device port operable to connect with an external DC power device consisting of one of a DC power source and a rechargeable DC battery;
    a plurality of output device ports each operable to connect with a different external DC power device consisting of one of a DC power load and a rechargeable DC battery;
    a power distribution network operable to receive instantaneous input power from the at least one input device port and to distribute the instantaneous input power to selected at least one of the plurality of output device ports;
    operating programs including an energy management schema and a battery charging manager operating on the controller data processing device, wherein the energy management schema is operable to;
        poll each device port to determine an instantaneous configuration of the power distribution and control module;
        determine a device type for each external power device connected to one of the plurality of device ports;
        determine a total instantaneous input power available from the at least one input device port, determine a total instantaneous power demand associated with any DC power loads connected to the plurality of output device ports;
        allocate at least a portion of the total instantaneous input power to at least a portion of the total instantaneous power demand associated with any DC power loads connected to the plurality of output device ports;

determine a Total Charging Power (TCP) equal to the unallocated portion of the total instantaneous input power;

allocate the TCP to the one or more of any rechargeable DC batteries connected to the plurality of output device ports according to allocation criteria.

14. The power distribution and control module of claim 13:

wherein the least one input device port comprises a single input device port operable to receive input power from a single external DC power source;

wherein the plurality of output device ports are connected to a plurality of rechargeable DC batteries and no DC power loads;

wherein the energy management schema is further operable to determine an instantaneous State of Charge (SoC) of each of the plurality of rechargeable DC batteries and to determine an average state of charge (ASoC) based on the instantaneous SoCs;

wherein the battery charging manager is operable to allocate the total instantaneous input power to all of the plurality of rechargeable DC batteries connected to the plurality of output device ports according to the allocation criteria;

wherein the allocation criteria are configured to allocate the total instantaneous input power to all of the plurality of rechargeable DC batteries connected to the plurality of output device ports in a manner that tends to equalize the SoC of all of the plurality of rechargeable DC batteries;

wherein the above listed steps are repeated at a frequency of 1 Hz or greater.

15. The power distribution and control module of claim 13 wherein the plurality of output device ports are connected to a plurality of rechargeable DC batteries and to at least one DC power load.

* * * * *